US012777261B2

(12) United States Patent
Wilton

(10) Patent No.: US 12,777,261 B2
(45) Date of Patent: Oct. 27, 2026

(54) SYSTEM AND METHOD FOR REDUCING STRAY LIGHT INTERFERENCE IN OPTICAL SYSTEMS

(71) Applicant: LG INNOTEK CO., LTD., Seoul (KR)

(72) Inventor: Samuel Richard Wilton, Levittown, PA (US)

(73) Assignee: LG INNOTEK CO., LTD., Seoul (KR)

( * ) Notice: Subject to any disclaimer, the term of this patent is extended or adjusted under 35 U.S.C. 154(b) by 64 days.

(21) Appl. No.: 19/048,551

(22) Filed: Feb. 7, 2025

(65) Prior Publication Data

US 2025/0184619 A1 Jun. 5, 2025

Related U.S. Application Data

(63) Continuation of application No. 18/176,561, filed on Mar. 1, 2023, now Pat. No. 12,256,155.

(60) Provisional application No. 63/402,130, filed on Aug. 30, 2022.

(51) Int. Cl.

| | |
|---|---|
| ***H04N 23/81*** | (2023.01) |
| ***G01S 17/88*** | (2006.01) |
| ***G01S 17/894*** | (2020.01) |
| ***H04N 23/71*** | (2023.01) |
| ***H04N 25/60*** | (2023.01) |
| ***H04N 25/62*** | (2023.01) |
| ***H04N 25/671*** | (2023.01) |

(52) U.S. Cl.

CPC ............. *H04N 23/81* (2023.01); *H04N 23/71* (2023.01); *H04N 25/671* (2023.01)

(58) Field of Classification Search

CPC ...... H04N 23/81; H04N 23/71; H04N 25/671; H04N 25/60; H04N 25/62; G01S 7/4876; G01S 7/5207; G01S 17/00; G01S 17/88; G01S 17/894

See application file for complete search history.

(56) References Cited

U.S. PATENT DOCUMENTS 9,823,353 B2 11/2017 Eichenholz et al.
12,256,155 B2 * 3/2025 Wilton .................... H04N 23/81
12,481,037 B2 * 11/2025 Keilaf .................... G01S 7/4816

(Continued)

*Primary Examiner* — Marly S Camargo

(74) *Attorney, Agent, or Firm* — Birch, Stewart, Kolasch & Birch, LLP

(57) ABSTRACT

A method for reducing optical interference in an optical sensor including detecting, by an optical sensor device comprising a plurality of pixel sensors, a signal with a reflected light component and a stray light component, estimating, by a processor, a stray light intensity in each pixel of the plurality of pixel sensors using a point spread function obtained by emitting a reference light signal and measuring intensities detected by the plurality of pixel sensors, identifying, by the processor, at least one pixel associated with a relatively high intensity from the plurality of pixel sensors of the optical sensor device, wherein the identified pixel is considered to be associated with a retroreflector or a bloom causing object, adjusting, by the processor, a noise probability for the signal using the estimated stray light intensity and an unbiased noise intensity, and adjusting, by the processor, a signal confidence score using the adjusted noise probability.

20 Claims, 16 Drawing Sheets

(56) References Cited

U.S. PATENT DOCUMENTS

| | | | | |
|---|---|---|---|---|
| 2012/0008128 | A1* | 1/2012 | Bamji | G01S 17/36 356/5.01 |
| 2020/0072946 | A1 | 3/2020 | Fisher et al. | |
| 2022/0011432 | A1 | 1/2022 | Daami et al. | |
| 2022/0276351 | A1 | 9/2022 | Ferreira et al. | |
| 2022/0276352 | A1 | 9/2022 | Ferreira et al. | |
| 2023/0393271 | A1 | 12/2023 | Embry et al. | |
| 2024/0103138 | A1 | 3/2024 | Li et al. | |
| 2024/0125940 | A1 | 4/2024 | Tachwali et al. | |

* cited by examiner

SYSTEM AND METHOD FOR REDUCING STRAY LIGHT INTERFERENCE IN OPTICAL SYSTEMS

CROSS-REFERENCE TO RELATED APPLICATIONS

This application is a Continuation of application Ser. No. 18/176,561, filed on Mar. 1, 2023, which claims priority to U.S. Provisional Patent Application No. 63/402,130, filed on Aug. 30, 2022. All of the above applications are hereby expressly incorporated by reference into the present application.

BACKGROUND

Autonomous vehicles (AVs) use a plurality of sensors for situational awareness. The sensors, which may be part of a self-driving system (SDS) in the AV, may include one or more of: camera, lidar (Light Detection and Ranging) device, inertial measurement unit (IMU) and their likes. Sensors such as cameras and lidar are used to capture and analyze scenes around the AV. This is used to detect objects including static objects such as fixed constructions, and dynamic objects such as pedestrians and other vehicles. Data from such sensors may also be used to detect conditions such as road markings, lane curvature, traffic lights and traffic signs, etc. Sometimes, a scene representation such as point cloud obtained from the AV's lidar device may be combined with one or more images from one or more cameras to obtain further insights to the scene or situation around the AV.

A sensor such as a lidar sensor operating on an AV may include a combination of hardware components (for example, transceiver apparatus including a transmitter assembly and a receiver assembly, processing circuitry, cooling systems, etc.), as well as software components (for example, software code and algorithms that generate 3D point clouds and signal processing operations that enhance object detection, tracking, and projection).

SUMMARY

At least some of the problems associated with the existing solutions will be shown as being solved by the subject matter of the independent claims that are included in this document. Additional advantageous aspects are discussed in the dependent claims.

The present disclosure concerns implementing systems and methods for reducing optical interference in an optical sensor. The methods comprise: detecting, by an optical sensor device comprising a plurality of pixel sensors, a signal with a reflected light component and a stray light component; estimating, by a processor, a stray light intensity in each pixel of the plurality of pixel sensors using a measured mapping of an intensity of stray light relative to an intensity of reflected light, wherein the measured mapping is derived from the measured intensities associated with all pixel sensors of the optical sensor device; adjusting, by the processor, a noise probability for the signal using the estimated stray light intensity and an unbiased noise intensity; and adjusting, by the processor, a signal confidence score using the adjusted noise probability.

The methods described above may be embodied in a system including a processor and memory containing programming instructions that, when executed, will cause the processor to implement the actions described above. Various embodiments also include a computer program product that contains such programming instructions, and a memory containing the computer program product.

BRIEF DESCRIPTION OF THE DRAWINGS

The accompanying drawings are incorporated into this document and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
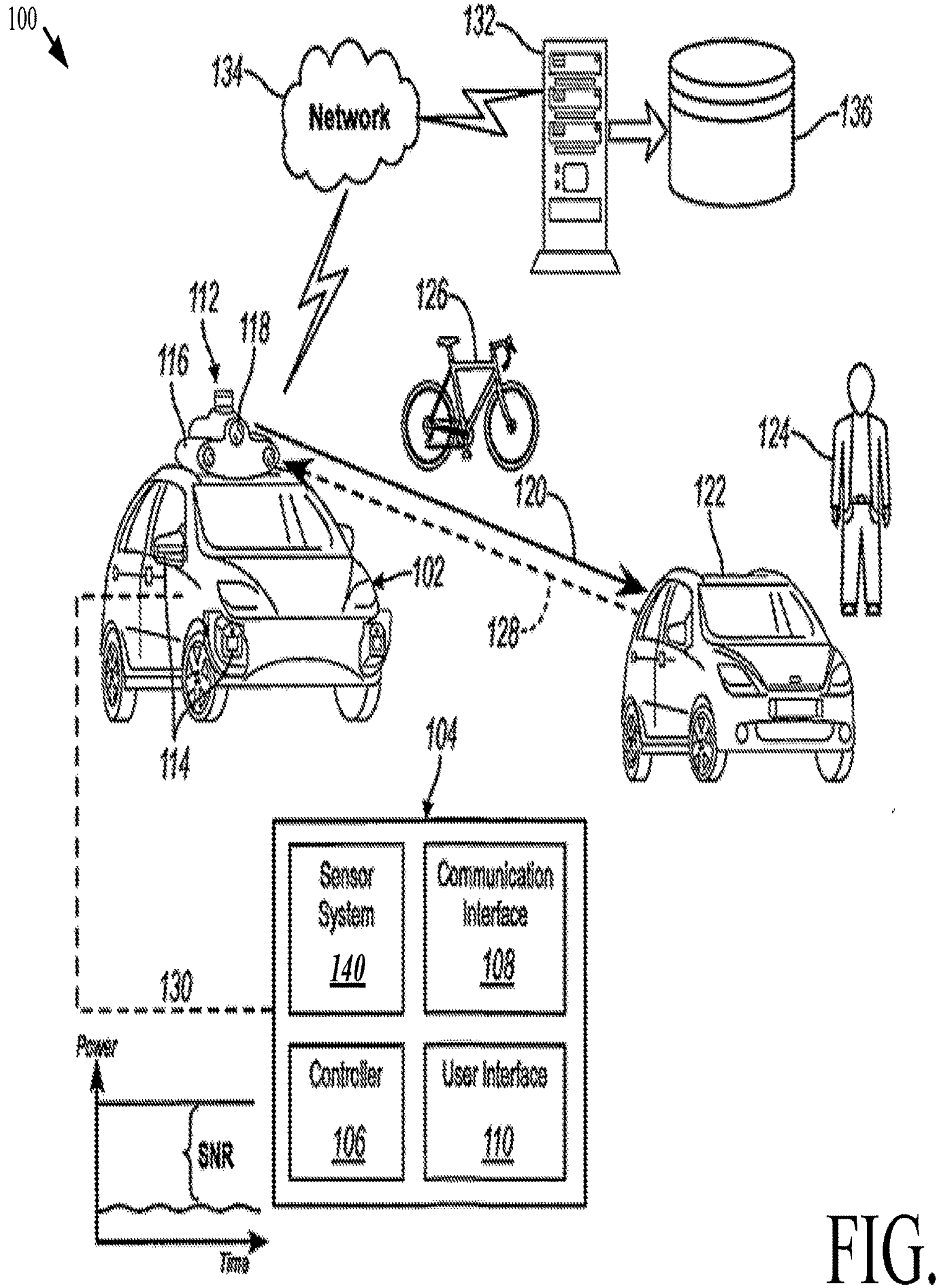
FIG. 1 provides an illustration of a system.

A lidar transceiver may include one or more photodetectors. A photodetector is an optoelectronic device that converts incident light or other electromagnetic radiation in the ultraviolet (UV), visible, and infrared spectral regions into electrical signals. Photodetectors may be used in a wide array of applications, including, for example, fiber optic communication systems, process controls, environmental sensing, safety and security, and other imaging applications such as light detection and ranging applications. High photodetector sensitivity can enable detection of faint signals returned from distant objects. Such sensitivity to optical signals can be susceptible to high optical noise sensitivities. Accordingly, the proposed systems and methods of the present disclosure provide solutions to reduce optical noise sensitives and stray light interference in photodetector devices.

Photodetectors can be used in light detection and ranging applications (for example, within lidar systems). A desirable attribute of a lidar system is long range detection, which depends on photodetector sensitivity. Long range detection may be achieved using a very sensitive photodetector. High photodetector sensitivity can enable detection of faint signals returned from distant objects, hence, providing a lidar device that is capable of detecting objects at long ranges. However, sensitivity to optical signals may also correlate with sensitivity to optical noise. Due to this correlation, it is desirable for a device deploying a photodetector (for example, a lidar system) to reduce the optical noise sensitivity.

One such example of noise sensitivity may be due to stray light reflections within a photodetector receiver (for example, lidar receiver). Specifically, within a receiver's FPA, discrete micro-lens arrays that are used to enhance an optical fill factor may produce total internal reflections that can cause a die to function as a light pipe by carrying stray light long distances from the source location. This can result in an optical blooming effect, a type of optical noise which can temporarily blind a particularly sensitive detector to other signals. An example of optical blooming may be caused by a returned light signal from a retroreflector (for example, a stop sign or a rear light assembly of a vehicle) where the light intensity is highly concentrated (i.e., not diffused).

There may be a combination of hardware and software solutions that can be implemented to reduce the effects of optical blooming, thereby improving the detection capabilities of a lidar sensor. Such hardware solutions are described in U.S. patent application Ser. No. 17/752,189 ("the '189 application"), which is incorporated herein by reference in its entirety. The present document describes a signal processing approach to further enhance the detector's capability in detecting and managing stray light produced by blooming effect. The methodologies described herein can work independently or in combination with the hardware solutions (for example, that of the '189 application) to produce improved detection of data and more accurate 3D maps.

Accordingly, this document describes system, apparatus, device, method and/or computer program product embodiments, and/or combinations and sub-combinations of any of the above, for reducing optical interference in an optical sensor device. The optical sensor device can include a plurality of pixels. The methods generally involve: (i) detecting, by the optical sensor device, a signal with a reflected light component and a stray light component; (ii) estimating, by a processor, a stray light intensity in each pixel of the optical sensor device using a measured mapping of an intensity of stray light relative to an intensity of reflected light (wherein the measured mapping is derived from the measured intensities associated with all pixel sensors of the optical sensor device); (ii) adjusting, by the processor, a noise probability for the signal using the estimated stray light intensity and an unbiased noise intensity; (iv) adjusting, by the processor, a signal confidence score using the adjusted noise probability; and/or (v) using the adjusted signal confidence score to control autonomous operations of a robot.

The noise probability may be adjusted in (ii) by adding the estimated stray light intensity to the unbiased noise intensity or by multiplying a first number derived using the unbiased noise intensity and a second number derived using the estimated stray light intensity. The adjusted signal confidence score may be a function of a span count and a trial count in addition to the adjusted noise probability. The measured mapping may comprise a point spread function obtained by emitting a reference light signal towards a particular pixel sensor and measuring an intensity of light detected by all other ones of the pixel sensors.

The methods can also include points in a point cloud as bloom points, wherein the point cloud is generated based on outputs from the optical sensor device. The classification may be achieved by identifying points of the point cloud that have range values within a given range tolerance defined by the minimum range and maximum range associated with a pixel considered to possibly be associated with an object causing bloom. The identified point may be filtered using heuristics or confidence thresholding. The methods can further include: adjusting an intensity of the reflected light using the adjusted noise probability and a photon detection efficiency; and filtering points from a point cloud based on a comparison of the adjusted signal confidence score to a threshold value.

As noted above, the reduction of optical noise inside an FPA and/or the effects of such optical noise can improve the detection of an incident signal at the detector (for example, a returned light signal). Reduction of the optical noise by the present solution can lead to the reduction/attenuation of the bloom effect at the detector. This reduction can significantly improve the detection capability of the detector especially when the returned light signal is received from a highly reflective object (for example, road signs (directional signs, yield signs, stop signs, etc.)) that include embedded reflective material, any other objects that include embedded reflective material, or other highly reflective objects. The present solution also reduces the likelihood that an optical sensor (such as a lidar sensor) can be blinded by returned light signals, thereby improving detection capabilities and further enabling downstream applications such as autonomous transportation and navigation.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to."

In this document, the term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

Definitions for additional terms that are relevant to this document are included at the end of this Detailed Description.

Notably, this document describes the present solution in the context of an AV. However, the present solution is not limited to AV applications. The present solution may be used in other applications such as other robotic applications, lidar sensor based system applications, metric applications, and/or system performance applications.

FIG. 1 shows a system 100 implementing the present solution. System 100 comprises an AV 102 with an AV system 104. The AV system 104 includes a sensor system 140, a controller 106, a communication interface 108 for communicating with other systems, and a user interface 110 for communicating with a user. The sensor system 140 includes multiple sensor assemblies 112, 114 mounted to the AV 102. The sensor assemblies 112, 114 are provided for monitoring an environment external to the AV 102.

The top sensor assembly 112 is mounted to a roof of the AV 102 and includes lidar system(s). Each lidar system includes emitter(s) 116 and detector(s) 118. The emitter(s) 116 transmit light pulses 120 away from the AV 102. The transmitted light pulses 120 are incident on one or more objects (for example, a remote vehicle 122, a pedestrian 124 and a cyclist 126) and reflect back toward the top sensor assembly 112 as reflected light pulses 128. The top sensor assembly 112 guides the reflected light pulses 128 toward the detectors 118, which provide corresponding light signals 130 to the controller 106. The controller 106 processes the light signals 130 to determine a distance of each object 122, 124, 126 relative to the AV 102.

The side sensor assemblies 114 include cameras (for example, visible spectrum cameras, infrared cameras, etc.), lidar system(s) and/or radar system(s). The top sensor assembly 112 may also additionally include camera(s) and/or radar system(s).

The AV system 104 may communicate with a remote computing device 132 over a network 134 (for example, the Internet). The remote computing device 132 may include one or more servers to process one or more processes of the technology described herein. The remote computing device 132 may also communicate with a database 136 over the network 134.

Figure 2:
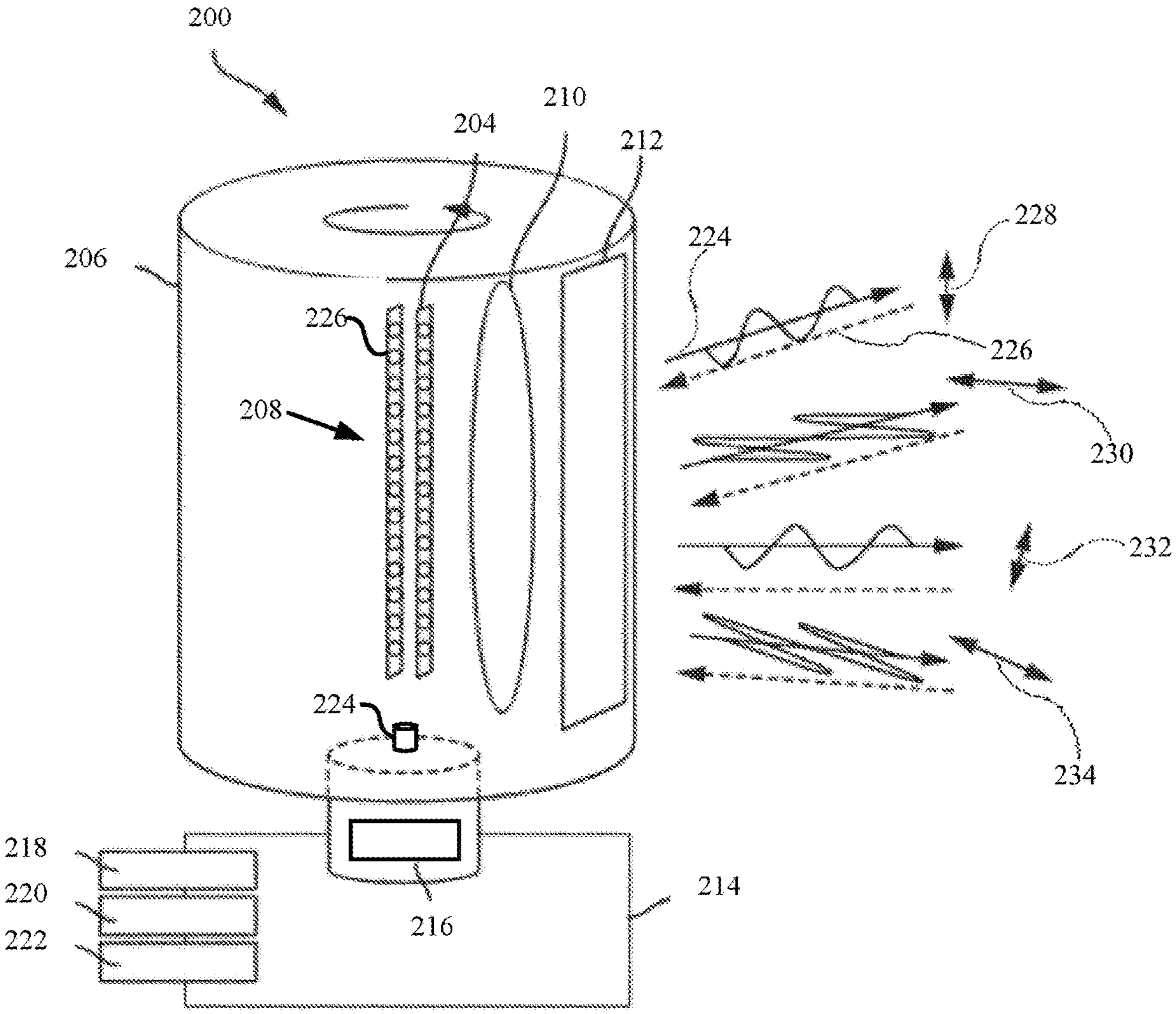
FIG. 2 provides an illustration of a lidar system.

FIG. 2 illustrates an architecture for a lidar system 200, in accordance with aspects of the disclosure. Lidar system 200 is merely an example lidar system and that other lidar systems are further contemplated in accordance with aspects of the present disclosure, as should be understood by those of ordinary skill in the art.

As shown in FIG. 2, the lidar system 200 includes a housing 206 which may be rotatable 360° about a central axis such as hub or axle 224 of a motor 216. The housing 206 may include an emitter/receiver aperture 212 made of a material transparent to light. Although a single aperture is shown in FIG. 2, the present solution is not limited in this regard. In other scenarios, multiple apertures for emitting and/or receiving light may be provided. Either way, the lidar system 200 can emit light 224 through one or more of the apertures 212 and receive reflected light 226 back toward one or more of the apertures 212 as the housing 206 rotates around the internal components. The emitted light 224 and the received light 226 can also have different orientations 228, 230, 232 and 234 as shown in FIG. 2. In alternative scenarios, the outer shell of housing 206 may be a stationary dome, at least partially made of a material that is transparent to light, with rotatable components inside of the housing 206.

Inside the rotating shell or stationary dome is a light emitter system 204 that is configured and positioned to generate and emit pulses of light through the aperture 212 or through the transparent dome of the housing 206 via one or more laser emitter chips or other light emitting devices. The light emitter system 204 may include any number of individual emitters (for example, 8 emitters, 64 emitters, or 128 emitters). The emitters may emit light of substantially the same intensity or of varying intensities.

The lidar system 200 also includes a light detector 208 containing an array of photodetectors 226. The photodetectors 226 are positioned and configured to receive light reflected back into the system. Upon receiving reflected light, the photodetectors 226 produce results (or electrical pulses) indicating measured intensities of the light signal reflected off an object external to the lidar system. In Geiger mode applications, the photodetectors 226 fire when a single photon at or near a target wavelength is detected thereby. The photodetectors can include Geiger-mode avalanche photodetectors (or gmapds). The times of the photodetector firings are recorded as timestamps. The light emitter system 204 and light detector 208 rotate with the rotating shell, or they rotate inside the stationary dome of the housing 206. One or more optical element structures 210 may be positioned in front of the light emitting system 204 and/or the light detector 208 to serve as one or more lenses or wave plates that focus and direct light that is passed through the optical element structure 210.

One or more optical element structures 210 may be positioned in front of a mirror (not shown) to focus and direct light that is passed through the optical element structure. As shown in FIG. 2, a single optical element structure 210 is positioned in front of the mirror and connected to the rotating elements of the system so that the optical element structure 210 rotates with the mirror. Alternatively or additionally, the optical element structure 210 may include multiple such structures (for example, lenses and/or waveplates). Optionally, multiple optical element structures 210 may be arranged in an array on or integral with the shell portion of the housing 206.

The lidar system 200 includes a power unit 218 to power the light emitting system 204, motor 216, and electronic components. The lidar system 200 also includes an analyzer 214 with elements such as a processor 222 and non-transitory computer-readable memory 220 containing programming instructions. The programming instructions are configured to enable the system to receive data collected by the light detector 208, analyze the received data to measure characteristics of the light received, and generate information that a connected system can use to make decisions about operating in an environment from which the data was collected. Optionally, the analyzer 214 may be integral with the lidar system 200 as shown, or some or all of it may be external to the lidar system and communicatively connected to the lidar system via a wired or wireless communication network or link.

Figure 3:
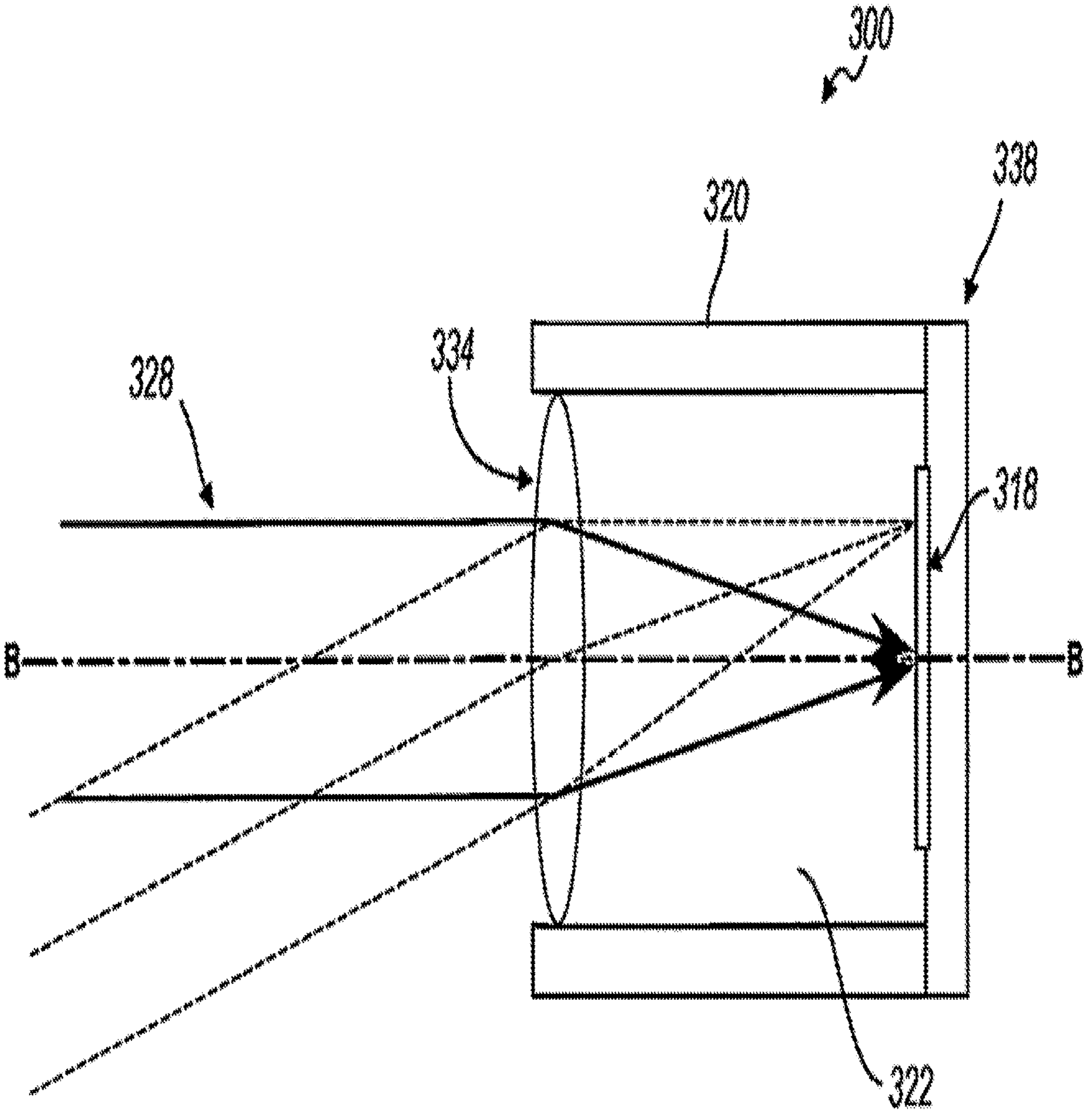
FIG. 3 provides a side view of a photodetector receiver assembly.
Figure 4A:
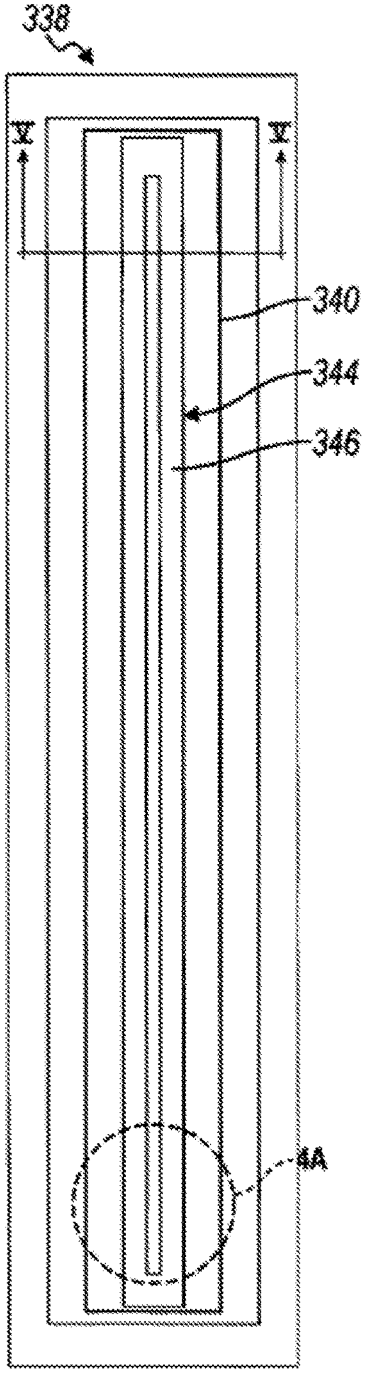
FIG. 4A provides a front view of an image sensor assembly of the photodetector receiver assembly shown in FIG. 3. The image sensor assembly is also referred to herein as a focal plan assembly (FPA) to indicate that it has a detector area placed in the focal plane of the photodetector receiver assembly.

FIG. 3 illustrates a receiver assembly 300 of the lidar system 200. The receiver assembly 300 includes a housing 320 that defines a cavity 322 that is aligned along an optical axis B-B. The receiver assembly 300 supports a lens 334 and an FPA 338. The lens 334 may comprise a collimator lens. The lens 334 focuses the reflected light pulses 328 at a focal plane within the FPA 338.

As shown in FIGS. 4A-5B, the FPA 338 supports an array of detectors 318, such as a photo-diode array (PDA). The FPA 338 includes a base 340 that is formed in an elongate shape with a central opening 342. The FPA 338 also includes a circuit board assembly 344 that is mounted to the base 340 and disposed over the central opening 342. The array of detectors 318 are mounted to a top surface 346 of the circuit board assembly 344. The FPA 338 also includes sidewalls 348 that extend transversely from a periphery of the base 340 to define a cavity 350. The FPA 338 also includes a cover 352 that extends between a distal end 354 of the sidewalls 348 to enclose the cavity 350. The cover 352 is formed of an optically transparent material (for example, glass and/or sapphire) to receive the reflected light pulses 328. The FPA 338 also includes a micro-lens array (MLA) 356 that is mounted to the array of detectors 318.

Figure 5A:
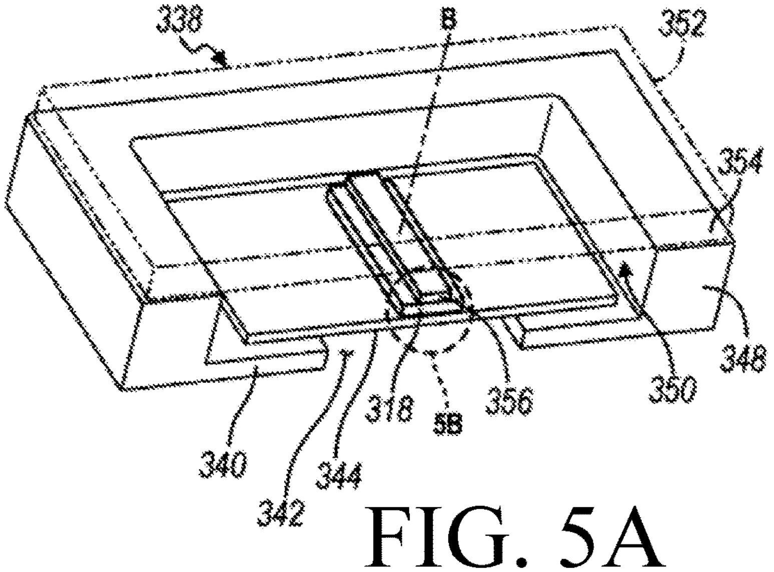
FIG. 5A provides a perspective section view of the FPA shown in FIG. 4A taken along line V-V.
Figure 5B:
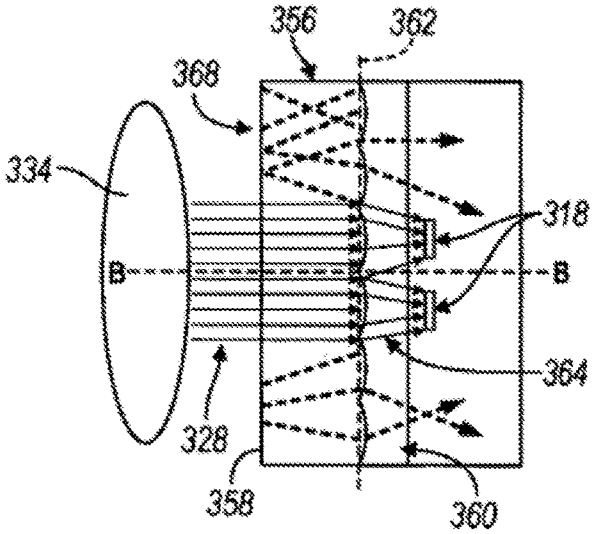
FIG. 5B provides an enlarged view of a portion of the FPA shown in FIG. 5A.

With reference to FIG. 5B, the MLA 356 is formed in a rectangular packing configuration with a spherical, refractive, and single-sided lens profile. The MLA 356 may be formed in a single-sided plano-convex lens profile. The MLA 356 includes a planar input surface 358 that receives the reflected light pulses 328 from the lens 334. The MLA 356 also includes an array of convex optics 360 that form an output surface. The array of convex optics 360 are arranged along a focal plane 362.

Figure 4B:
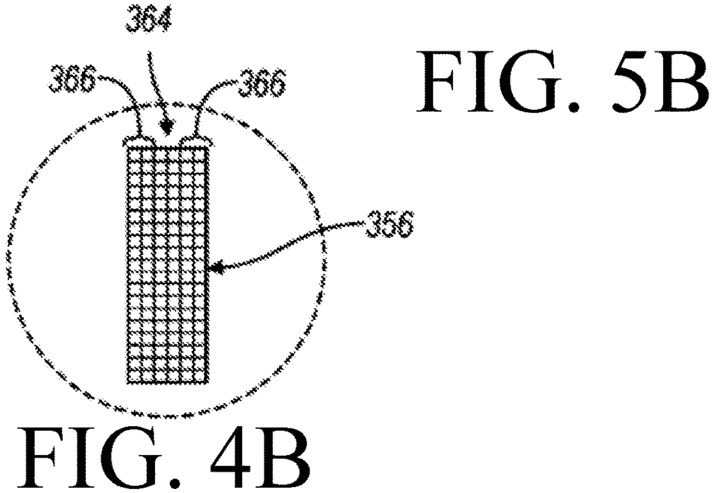
FIG. 4B provides an enlarged view of a portion of the FPA shown in FIG. 4A.

The MLA 356 forms a plurality of apertures that extend between the planar input surface 358 and the output surface, including central apertures 364 and outer apertures 366 (shown in FIG. 4B). Each convex optic of the array of convex optics 360 is associated with an aperture, and each detector of the array of detectors 318 is optically aligned with one of the central apertures 364. The central apertures 364 and the outer apertures 366 are clear, or optically transparent. FIG. 5B illustrates two central apertures 364 that each focus the reflected light pulses 328 on an optically aligned detector of the array of detectors 318, as depicted by reflected light pulses 328 shown in solid line. The outer apertures 366 scatter the reflected light pulses 328 within the MLA 356 and around the cavity 350, as depicted by reflected light pulses shown in broken line, which may lead to optical noise.

Referring back to FIG. 3, the receiver assembly 300 may include sensitive detectors 318 to detect faint signals reflected from distant objects to achieve long range. However, such sensitive detectors 318 may be susceptible to optical noise due to stray light reflections. The MLA 356, which is used to enhance optical fill factor, functions as a light pipe due to internal reflection, carrying stray light long distances from the source location. This results in optical blooming, which is generally referenced by numeral 368 in FIG. 5B, a type of optical noise which can temporarily blind particularly sensitive detectors to other signals.

Figure 6:
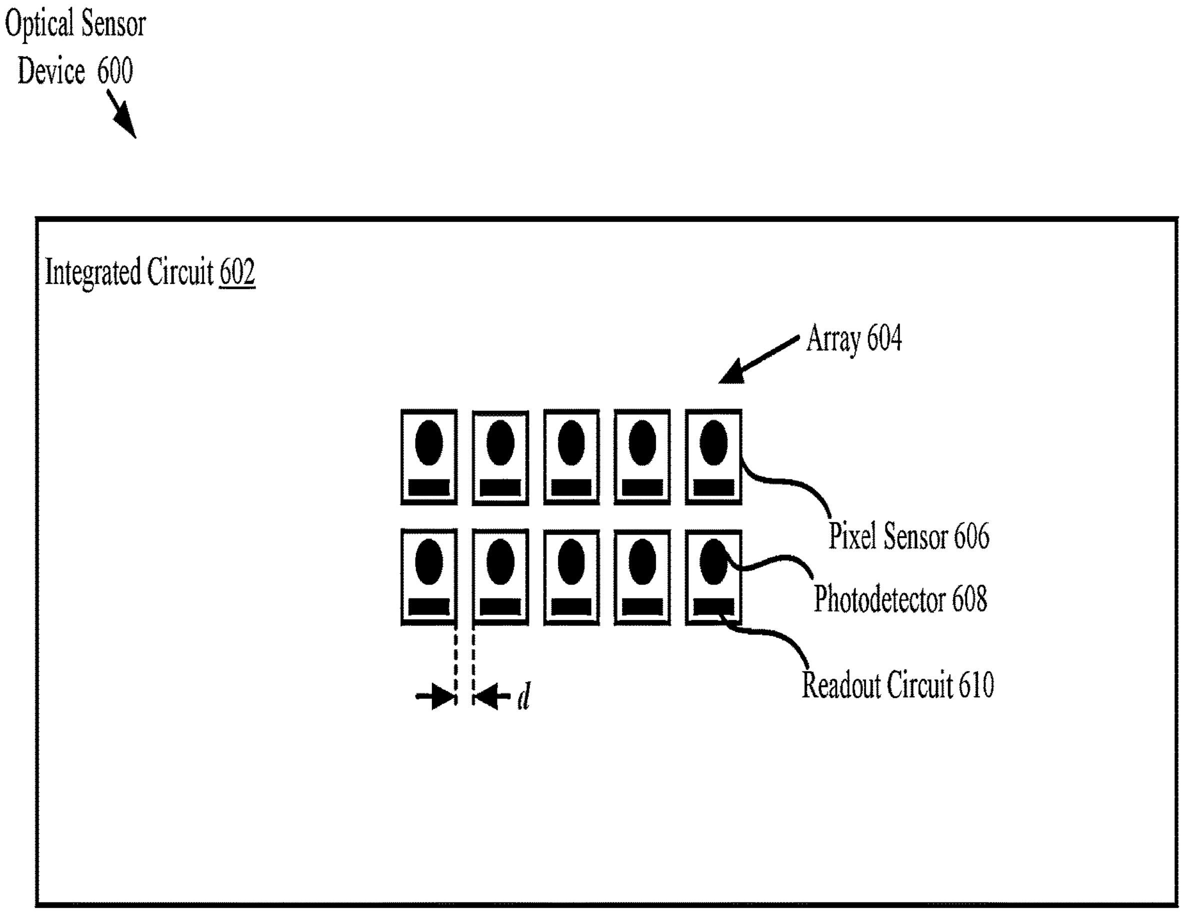
FIG. 6 provides an illustration of an optical sensor device.

The present solution overcomes known shortcomings of gmapds used in lidar systems. A gmpads based lidar system can be considered a pixel sensor. An illustration of an optical sensor device 600 is shown in FIG. 6. The optical sensor device 600 comprises an integrated circuit 602 containing an array of pixel sensors 604. The array of pixel sensors 604 is referred to generally herein as a column. Each pixel sensor 606 contains at least one gmapd 608 connected to a readout circuit 610. The readout circuit 610 can include separate circuit elements integrated in each pixel sensor 606 or alternatively comprise a circuit to which the pixel sensors are all connected. The gmpads 608 generally have a highly skewed aspect ratio. That is, the gmapds 608 tend to be very tall and thin. The array 604 typically has a size of 512×2 photodetectors, with a 25 micrometer pitch (i.e., distance d between adjacent pixels). The output of the readout circuit 610 indicates a time of arrival at which each photon is detected by pixel sensor 606. The time of arrivals can be used to calculate an intensity of a signal received at each discrete time by the optical sensor device. This intensity is referred to herein as $I_{pixel}$. Any known algorithm for computing the intensity can be used here. The signal received by the pixel sensor 606 can have a reflected light component, a stray light component, and/or a noise component. Thus, the intensity $I_{pixel}$ can represent an intensity of reflected light which may be combined with stray light and/or noise.

The gmapds 608 are sensitive to individual photons, and therefore can detect relatively small amounts of light. This feature provides the gmapds 608 with a high dynamic range. However, the dynamic range is not infinite (for example, when a signal is strongly reflected from retroreflector, the pixels can saturate). The photons generate sufficient electrons to match the bias voltage of the pixel sensor, after which the pixel sensor cannot detect any more photons.

The physical structure of the gmapds 608 may cause photons to be scattered, in systematic ways, within the photodetector. Photons that are initially directed to a first pixel may instead be guided to a different pixel though internal reflection, refraction or other means. For example, as noted above, the micro-lenses of MLA 356, designed to improve a fill factor (for example, focus photon to the center of the pixels and avoid the dead area in the spaces between pixels) may also cause stray light. The photons that are directed to the first pixel may produce signals in several different pixels, and in a systematic way. In effect, the point source of light is spread into the different pixels according to a function that can be empirically determined since it is based on the structure of the photodetector. One way to measure this point-spread function (PSF) is by using a bench-top collimated light source. The position of the light from the light source can be scanned across each pixel of the optical sensor device while the optical sensor device records the point spread for each light position.

Noise may added to the detected signals from a variety of sources. This noise can include thermal noise. The noise is generally random over time. This can make it difficult to detect low light levels in a single reading, but often subsequent readings can be averaged together to overcome the random noise.

Finally, detection algorithms tend to be performed close to the photodetector (for example, in a digital signal processor (DSP) and/or a field programmable gate array (FPGA)) integrated into the optical sensor device. These devices may have limited resources compared to a general-purpose desktop computer, and may be constrained to operate in real-time to, for example, produce a result within a finite period of time.

Thus, the problem solved by the present solution is that the returned signal from retroreflectors is so strong that the stray light creates strong signals in other pixels (i.e., the bloom effect). The present solution is designed to distinguish bloom artifacts from true signals.

Figure 7:
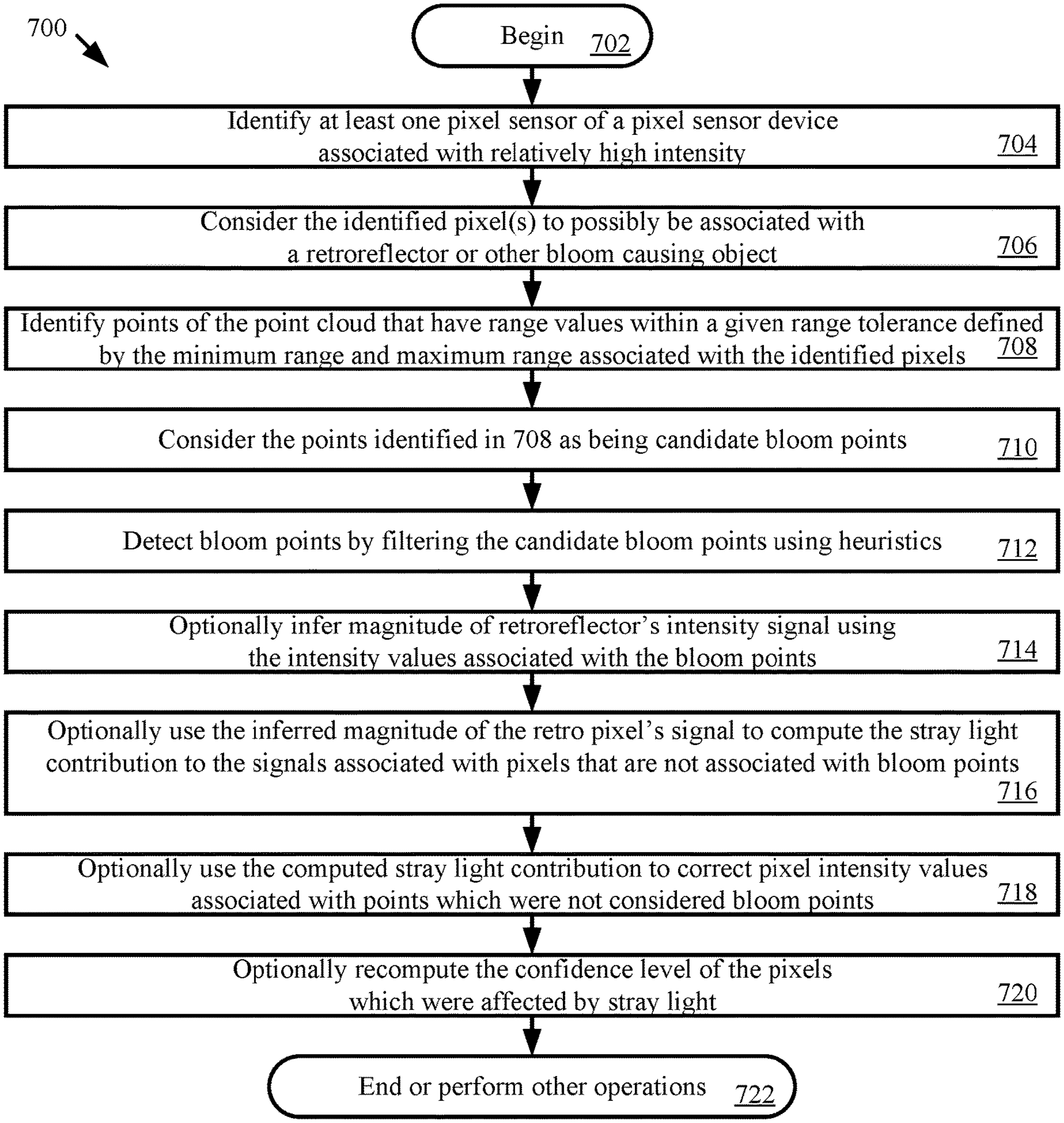
FIG. 7 provides a flow diagram of an optical bloom detection method for an optical sensor device.

An optical bloom detection method 700 for an optical sensor device (for example, optical sensor device 600 of FIG. 6) will now be discussed in relation to FIG. 7. Method 700 may be embodied in a system including a processor and memory containing programming instructions that, when executed, will cause the processor to implement the actions described above. Various implementations also include a computer program product that contains such programming instructions, and a memory containing the computer program product.

Method 700 begins with 702 and continues with 704 where at least one pixel associated with a relatively high intensity is identified from the pixels of the optical sensor device. The identified pixel(s) is (are) considered in 706 as possibly being associated with a retroreflector or other bloom causing object. In 708, the system finds points in the point cloud that have range values within a given range tolerance. The range tolerance can be defined by the minimum range and the maximum range associated with the pixels identified in 704. It should be noted that each point in the point cloud has an intensity value and a range value associated therewith. The intensity value and range value are both obtained based on the output of the optical sensor device (for example, optical sensor device 600 of FIG. 6) that is associated with a particular pixel sensor (for example, pixel sensor 606 of FIG. 6).

In 712, the system detects bloom points by filtering the candidate bloom points using heuristics (for example, a number of candidate bloom points and/or an intensity decay). The intensity level should become lower the further from the point(s) that was (were) considered in 706 to possibly be associated with the retroreflector or other bloom causing object. The heuristics are performed to detect discontinuities in intensity and/or range.

Once the bloom points have been detected, the magnitude of the retroreflector's signal can optionally be inferred in 714 using the intensity values of the bloom points. The magnitude can be inferred by, for example, applying a mapping in reverse to the intensity values associated with the bloom points. The mapping illustrates the intensity of stray light relative to the intensity of reflected light based on the intensities associated with the bloom points and the intensities of the retroreflector points. In this way, the retroreflector's intensity signal can be determined even if it is well above the saturation level.

The inferred magnitude of the retroreflector's intensity signal is optionally used in 716 to compute the stray light contribution to the signals associated with the points which are not considered bloom points. The measured mapping of stray light is rescaled using the inferred retroreflector intensity, and convolved over the identified retroreflector pixels. The resulting mapping after rescaling and convolution reveals the inferred stray light contribution of intensity in each pixel position across the sensor array.

The computed stray light contribution is optionally used in 718 to correct the pixel intensity values associated with points which were not considered bloom points. The system may also recompute the confidence level of the pixels which were affected by stray light. This re-computation can include computing a signal to noise ratio (SNR) in accordance with known algorithms. Subsequently, operations of block 722 are performed in which method 700 ends or other operations are performed.

In method 700, the accuracy of the retroreflector pixel classification cannot be verified. Saturated bloom may be detected as a retroreflector pixel. A saturated point has an intensity value that is greater than the maximum value that a pixel sensor can detect. High intensity diffuse objects may be detected as retroreflector pixels. It is difficult to distinguish between real objects mixed with stray light, and stray light alone. Line fitting based on intensity is a flawed approach because any fraction of points in the column at any offset from the retroreflector may be mixed with real objects. Pure bloom may be the minority of points and they may have consistently low intensity with high variance. Not every flat and low intensity surface is bloom.

Figure 8:
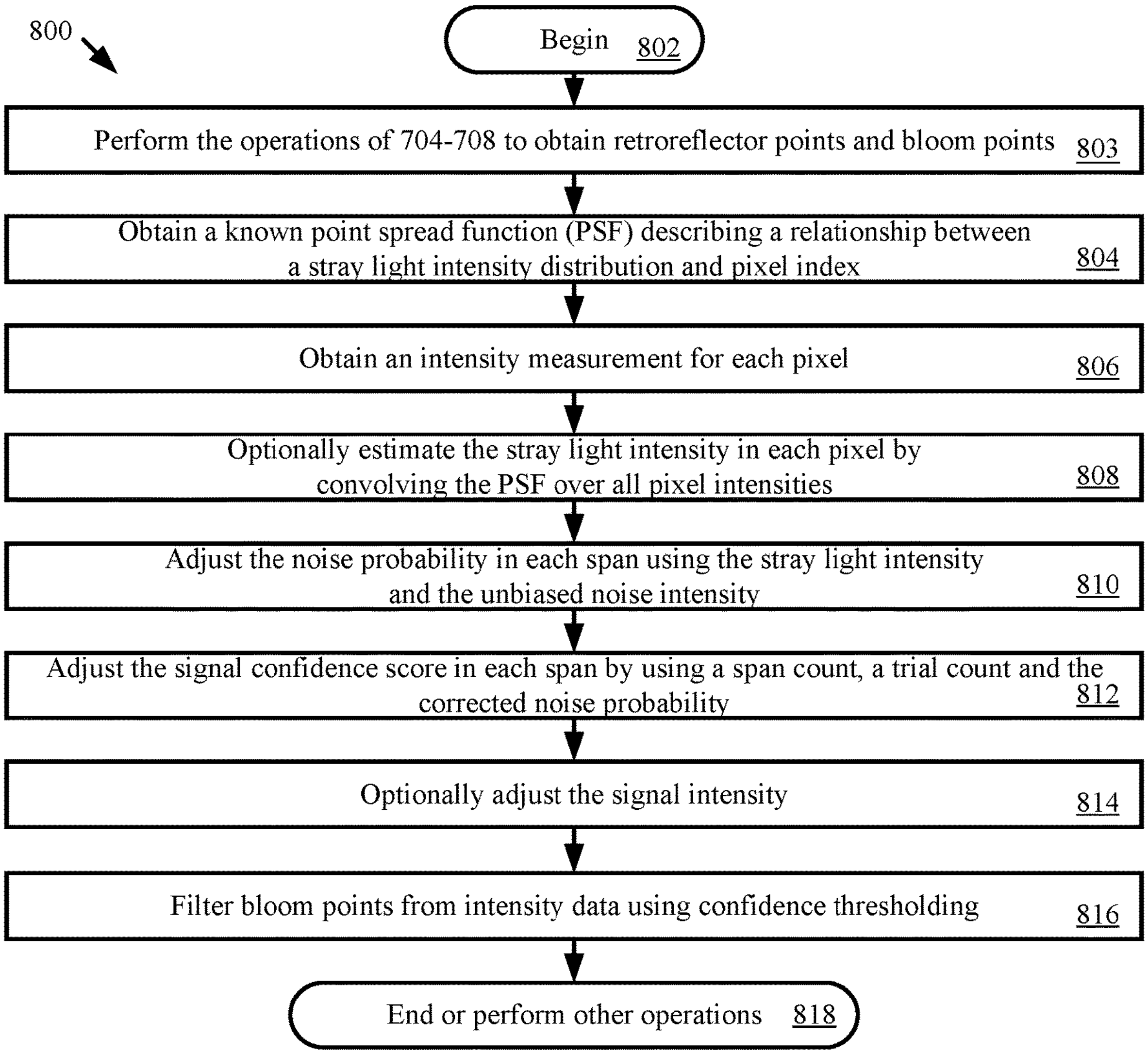
FIG. 8 provides a flow diagram of another optical bloom detection method for an optical sensor device.

FIG. 8 shows another bloom detection method 800. Method 800 may be embodied in a system including a processor and memory containing programming instructions that, when executed, will cause the processor to implement the actions described above. Various implementations also include a computer program product that contains such programming instructions, and a memory containing the computer program product.

Method 800 begins with 802 and continues with 803 where operations of block 704-708 are performed to (i) identify pixels that are possibly be associated with a retroreflector or other bloom causing object and (ii) identify bloom points. The system then obtains a known PSF describing the relationship between a stray light distribution and pixel index, as shown by 804. A look-up table (LUT) may be used here to retrieve a PSF from a datastore using an identifier for the pixel(s) identified in operation (i). The system also obtains an intensity measurement $I_{pixel}$ for each pixel, as shown by 806.

Next in 808, the system estimates the stray light intensity $I_{stray}$ in each pixel by convolving the PSF over all pixel intensities $I_{pixel}$. The estimation of $I_{stray}$ in each pixel can be defined by the following mathematical equation.

$$I_{stray} = \text{convolve}(I_{pixel}, PSF)$$

Figure 9:
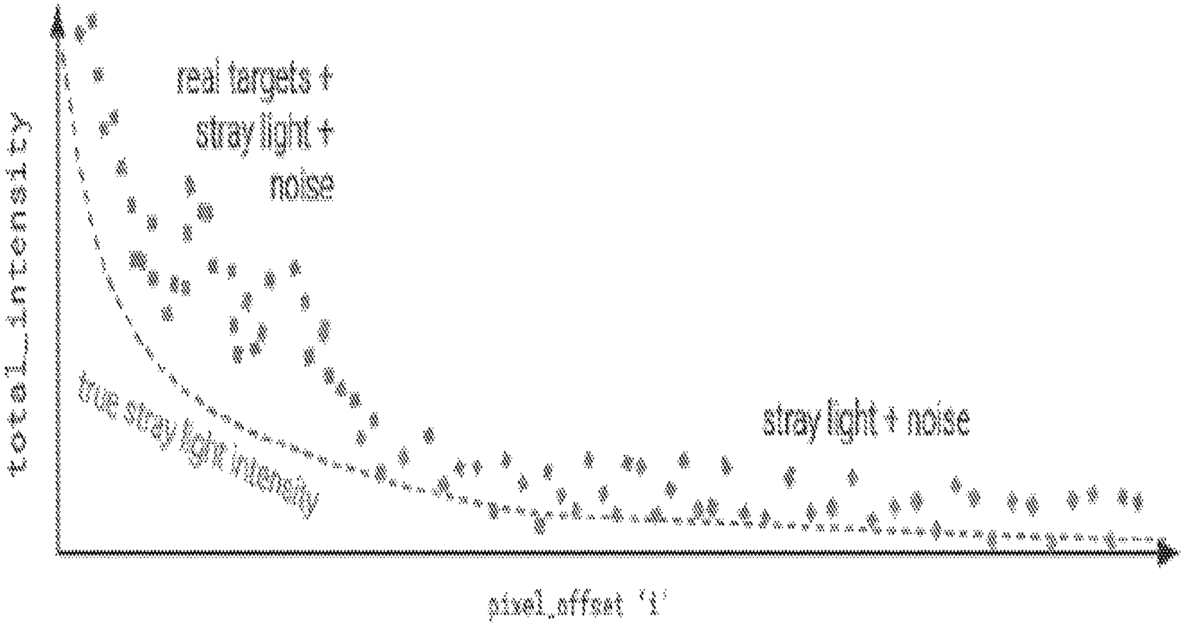
FIG. 9 provides a graph which shows a relationship between true stray light intensity and actual intensity measurements of signals including stray light and/or noise.

The pixel intensities $I_{pixel}$ are known or estimated from an intensity of at least one point in the point cloud which is considered to likely be caused by pure stray light. A graph is provided in FIG. 9 which shows a relationship between true stray light intensity and actual intensity measurements of signals including stray light and/or noise. This relationship can be used to determine whether a point in the point cloud was likely caused by pure stray light.

In some scenarios, the pixel intensity $I_{pixel}$ can be estimated given the following mathematical equations. The estimated pixel intensity is referred to as $I_{pixel\text{-}estimated}$.

$$I_{total} = I_{signal} + I_{noise} + I_{stray}$$

$$\sigma_{normalized}[i] = \text{convolve}(\text{ones}(s_{pixel}, PSF))[s_{pixel} + i]$$

$$I_{stray} = I_{pixel} * \sigma_{normalized}[i]$$

$$I_{noise} = I_{noise\text{-}unbiased}[i]$$

where $I_{total}$ represents a total intensity of a light pulse or signal received at a pixel sensor (for example, pixel sensor 606 of FIG. 6), $I_{signal}$ represents an intensity of a reflected light pulse (for example, reflected light pulse 128 of FIG. 1), $I_{noise}$ represents the intensity of noise, $\sigma_{normalized}$ represents a normalized scattering of light, $s_{pixel}$ represents a size of a pixel, and $I_{noise\text{-}unbiased}$ represents an unbiased noise intensity. The noise can include dark noise (which may be caused by imperfections in the photodetector structure and/or temperature of electronics), shot noise (i.e., variations of a detected signal from one instant to the next), thermal noise (which is caused by temperature in the semiconductor) and/or 1/f noise (i.e., frequency dependent noise).

In the pure stray light case given the mathematical equations, the following mathematical equations can be derived for $I_{total}$ and $I_{pixel\text{-}estimated}$.

$$I_{total} = I_{pixel} + \sigma_{normalized}[i] + I_{noise}$$

$$I_{pixel\text{-}estimated} = (I_{total}[i] - I_{noise}[i]) / \sigma_{normalized}[i]$$

Figure 10:
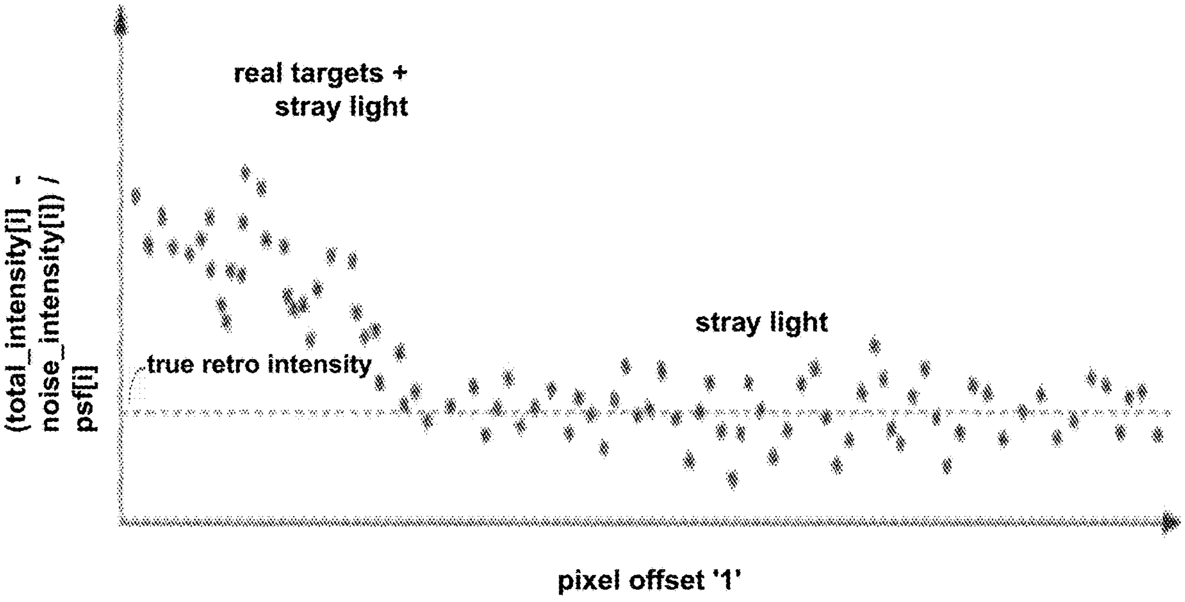
FIG. 10 provides a graph showing computed retroreflector intensity values.

All points with real target signals, normalized but the PSF, should yield a non-constant value which is greater than $I_{pixel}$. FIG. 10 provides a graph showing computed retro intensity values. The lowest flat region of the intensity data is considered the true retro intensity In the real target mixed with stray light case given the mathematical equations, the following mathematical equations can be derived for $I_{total}$ and $I_{pixel\text{-}estimated}$.

$$I_{total} = I_{pixel\text{-}estimated} * \sigma_{normalized}[i] + I_{noise} + I_{signal}$$

$$I_{pixel\text{-}estimated} + I_{signal}[i]/\sigma_{normalized}[i] = (I_{total}[i] - I_{noise}[i])/\sigma_{normalized}[i]$$

All points with real target signals, normalized but the PSF, should yield a non-constant value which is greater than $I_{pixel\text{-}estimated}$.

Figure 11:
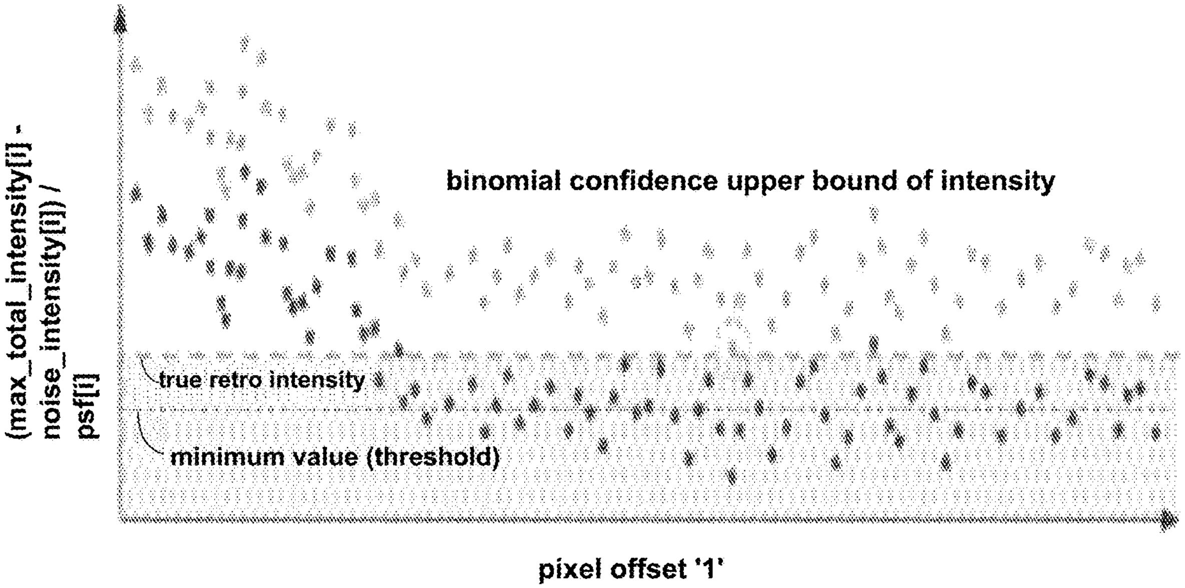
FIG. 11 provides a graph showing that a minimum value of $P_{binomial\text{-}upper\text{-}bound}$ is the upper bound of the retroreflector pixel intensities within a confidence $\Sigma$.

The pixel intensity $I_{pixel}$ can also be estimated using binomial confidence intervals. The measured stray light intensity may have very high variance. In many instances, it is necessary to apply a low pass filter to the intensity data to remove outliers and clamp the upper bound of possible retroreflector pixel intensity. It is possible to apply this filter in a statistically meaningful way. Given the following mathematical equations.

$$P_{max\text{-}total} = P_{binomial\text{-}upper\text{-}bound}(SP, ST, \Sigma)$$

$$I_{max\text{-}total} = -\ln(1.0 - P_{max\text{-}total})/pde$$

where $P_{max\text{-}total}$ represents a total maximum probability of avalanche of the photodetector, $P_{binomial\text{-}upper\text{-}bound}$ represents a binomial upper bound of retroreflector pixel intensities, SP represents a span count, ST represents a span trial, Σ represents a configured confidence interval, and pde represents a photon detection efficiency. The term "span" as used herein refers to a region of a histogram that contains a signal received at a pixel sensor. The term "span count" as used herein refers to a number of time of arrival events (or timestamps generated by the pixel sensor) that occurred in the span of the histogram. The term "span trial" as used herein refers to a number less than or equal to a total number of laser pulses emitted from the lidar sensor during a given period of time. The span trial number may be a function of all timestamps output from the readout circuit of pixel sensor during a given period of time and all timestamps specifying when each pixel sensor was turned on during the given period of time. A graph is provided in FIG. 11 which shows that a minimum value of $P_{binomial\text{-}upper\text{-}bound}$ is the upper bound of the retroreflector pixel intensities within a confidence Σ. All measured intensities above this threshold can be excluded. If the minimum value is too extreme, a percentile p can be used which can guard against cases where up to (1-p) of the data points contain real targets mixed with stray light.

In the pure stray light case given the mathematical equations, the following mathematical equations can be derived for the maximum pixel intensity $I_{max\text{-}pixel}$.

$$I_{max\text{-}pixel} = (I_{max\text{-}total}[i] - I_{noise}[i])/PSF[i]$$

All points which are pure stray light signals normalized by the PSF should yield a constant value which is the maximum pixel intensity $I_{max\text{-}pixel}$.

In the real target mixed with stray light case given the mathematical equations, the following mathematical equations can be derived for $I_{max\text{-}pixel}$.

$$I_{max\text{-}pixel} + I_{signal}[i]/PSF[i] = (I_{max\text{-}total}[i] - I_{noise}[i])/PSF[i]$$

All points which containing real target signals normalized by the PSF should yield a non-constant value which is greater than the maximum pixel intensity $I_{max\text{-}pixel}$.

Referring again to FIG. 8, the noise probability pn in each span is corrected in 810. This correction of pn may be achieved by adding the stray light intensity $I_{stray}$ to the unbiased noise intensity $I_{noise\text{-}unbiased}$. The corrected noise probability is referred to herein as $pn_{corrected}$. This computation is defined by the following mathematical equation using values expressed in an intensity domain.

$$pn_{corrected} = I_{stray} + I_{noise\text{-}unbiased}$$

Alternatively, $pn_{corrected}$ is computed in accordance with the following mathematical equation using values in a probability domain.

$$pn_{corrected} = pn_{total\text{-}noise}[i] = 1 - ((1 - pn_{unbiased}[i]) * (1 - pn_{stray}[i]))$$

$$pn_{stray}[i] = 1 - \exp(-I_{pixel\text{-}estimated} * PSF[i] * pde)$$

where $pn_{total\text{-}noise}$ represents a total noise probability, $ph_{unbiased}$ represents an unbiased noise probability, $pn_{stray}$ represents a stray light probability, and $I_{pixel\text{-}estimated}$ represents an estimated pixel intensity.

The signal confidence score S in each span is corrected in 812 by using the span counts c, trials t and the corrected noise probability $pn_{corrected}$. The corrected confidence score is referred to herein as $S_{corrected}$. This computation is defined by the following mathematical equations.

$$n = t[i]$$

$$p = pn_{total}[i] = c[i]/t[i]$$

$$S_{corrected} = (p - pn_{corrected})/sqrt(p * (1 - p)/n)$$

The present solution is not limited to this particular algorithm for computing the corrected confidence score. Other algorithms can be obtained based on a binomial distribution or other statistical distribution of the point cloud data.

The signal's intensity in each span $I_{signal}$[i] may be optionally corrected in 814. This correction can be achieved by subtracting the noise intensity $I_{noise}$ from the total intensity $I_{total}$. The corrected intensity measurement for the span is referred to herein as $I_{corrected\text{-}signal}$. This computation is derived from the following mathematical equations.

$$I_{total} = I_{noise} + I_{signal} + I_{stray}$$

$$I_{corrected\text{-}signal} = I_{total} - I_{noise}$$

Thus, $I_{corrected\text{-}signal}$ can be computed in accordance with the following mathematical equation:

$$I_{corrected\text{-}signal}[i] = -\ln((1-p)/(1-pn_{corrected}))/pde; \text{ or}$$

$$I_{corrected\text{-}signal}[i] = I_{signal}[i] - (-\ln(1-pn_{corrected})/pde).$$

where $I_{signal}$ represents an estimation of a signal intensity.

Upon completing 814, method 800 continues with 816 where confidence thresholding is performed to filter out bloom points. The confidence value of all candidate bloom points in the column will be reduced. There is no need for classification bits unless it is desirable to know which points were considered the retroreflector points and which points were considered the bloom points in the analysis. Subsequently, operations of 816 are performed in which method 800 ends or other operations are performed.

In method 800, there is no need for retroreflector pixel classification because the PSF may be convolved over all pixels indiscriminately. This is possible because the intensity ratio between the direct light and the scattered light is many orders of magnitude (for example, >>1e3).

If the PSF and retroreflector pixel intensity estimation are accurate, the probability that a span contains pure bloom is equal to the two-tailed p-value of the corrected confidence score $S_{corrected}$, which can be looked up in software for each point classified as a candidate bloom point in the point cloud. For example, if a confidence threshold of z>3.4 is used, then there is less than a one in fifteen thousand chance for each true bloom point to still be included in the point cloud.

Figure 12:
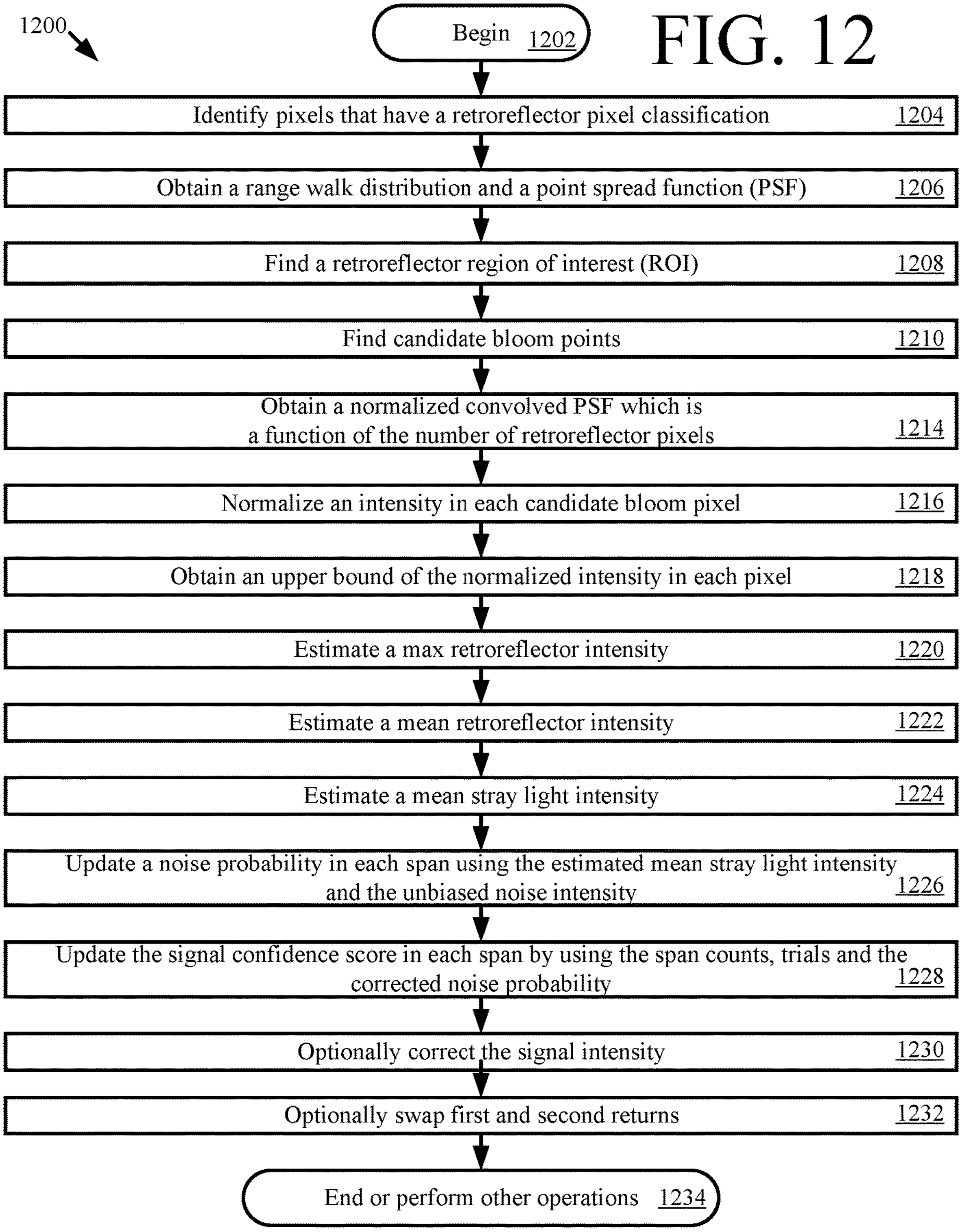
FIG. 12 provides a flow diagram of another optical bloom detection method for an optical sensor device.

FIG. 12 shows another bloom detection method 1200. Method 200 may be embodied in a system including a processor and memory containing programming instructions that, when executed, will cause the processor to implement the actions described above. Various implementations also include a computer program product that contains such programming instructions, and a memory containing the computer program product.

Method 1200 begins with 1202 and continues with 1204 where the system identifies pixels that have a retroreflector classification. In 1206, the system obtains a range walk distribution that represents a range bias verse true intensity up to a maximum retroreflector intensity. The system also obtains a PSF in which a normalized stray light intensity distribution is compared to a pixel index. An LUT can be used to retrieve the PSF from a datastore.

Next in 1208, the system performs operations to find a retroreflector region of interest (ROI) by segmenting saturated regions of pixels. This ROI can be obtained by performing the operations of block 708 in FIG. 7. The system performs operations in 1210 to find candidate bloom points in the retroreflector ROI. The candidate bloom points can be identified by locating points near a retroreflector range in the same column. The candidate bloom points can be identified by performing the operations of blocks 710-712 of FIG. 7.

In 1214, the system obtains a normalized convolved PSF which is a function of the number of pixels in the retroreflector ROI. The normalized convolved PSF accounts for the retroreflector size. An LUT can be used to look-up a PSF associated with a retroreflector size in pixel (i.e., the size of the retroreflector ROI). The system performs operations in 1216 to normalize an intensity in each candidate bloom pixel. These operations can involve dividing the measured intensity by the convolved PSF intensity at that pixel index.

In 1218, the system performs operations to obtain an upper bound of the normalized intensity in each pixel. The system performs operations in 1220 to estimate a max retroreflector intensity from a minimum value or a percentile of the upper bound normalized intensities. This estimation can be computed using mathematical equation $P_{max\text{-}total}=P_{binomial\text{-}upper\text{-}bound}$ (SP, ST, Σ). The system performs operations in 1222 to estimate a mean retroreflector intensity using only normalized intensities less than the max retroreflector intensity $I_{retro\text{-}max}$. The system performs operations in 1224 to estimate a mean stray light intensity $I_{stray\text{-}mean}$ by convolving the mean retroreflector intensity ROI with the PSF.

The system also performs operations in 1226 to update a noise probability pn in each span using the mean stray light intensity $I_{stray\text{-}mean}$ and the unbiased noise intensity $I_{noise\text{-}unbiased}$. These operations can be the same as or similar to those described above in relation to block 810 of FIG. 8. The signal confidence score S in each span is corrected in 1228 by using the span counts c, trials t and the corrected noise probability $pn_{corrected}$. The operations of 1228 can be the same as or similar to those described above in relation to block 812 of FIG. 8. The span signal's intensity $I_{signal}$ in each span may be optionally corrected in 1230. The operations of 1230 can be the same as or similar to those described above in relation to block 814 of FIG. 8.

In optional block 1232, first and second returns may be swapped if the first return has a lower updated confidence score than the second return. Subsequently, operations of 1234 are performed in which method 1200 ends or other operations are performed.

Figure 13:
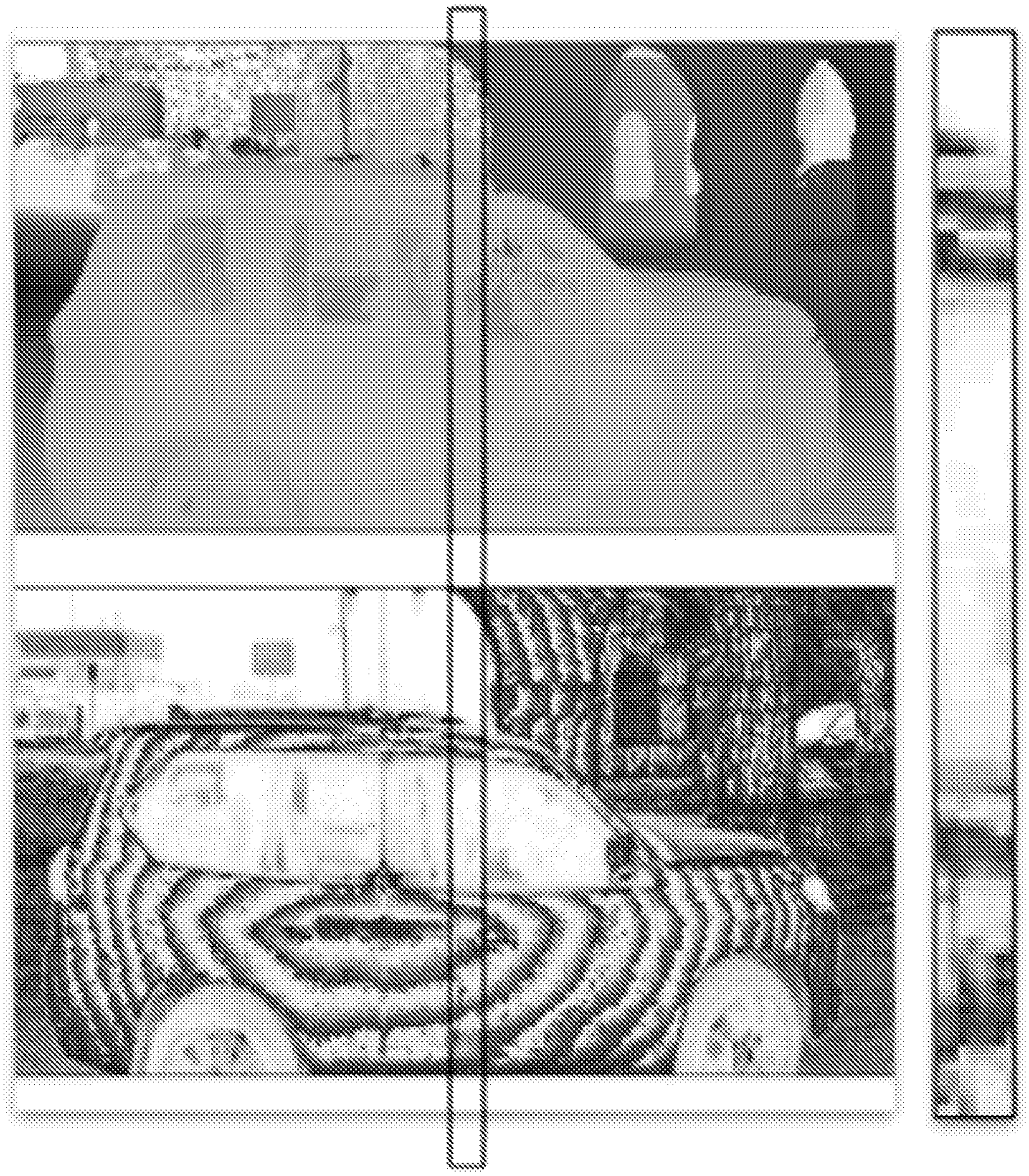
FIGS. 13 and 14 provide images that are useful for understanding operations of the method shown in FIG. 12.

FIG. 13 provides images that are useful for understanding method 1200. By implementing method 1200, the system will know that the car is relatively low intensity because the candidate bloom points near the car body are very low intensity. The PSF typically contains the greatest values at the smallest pixel offsets. A low suspect intensity divided by a large PSF value will result in a very low upper bound of the retroreflector intensity. Since none of the points on the car widow are pure stray light, the retroreflector intensity estimate may still be wrong (too high), but will be clamped to a reasonable value.

Figure 14:
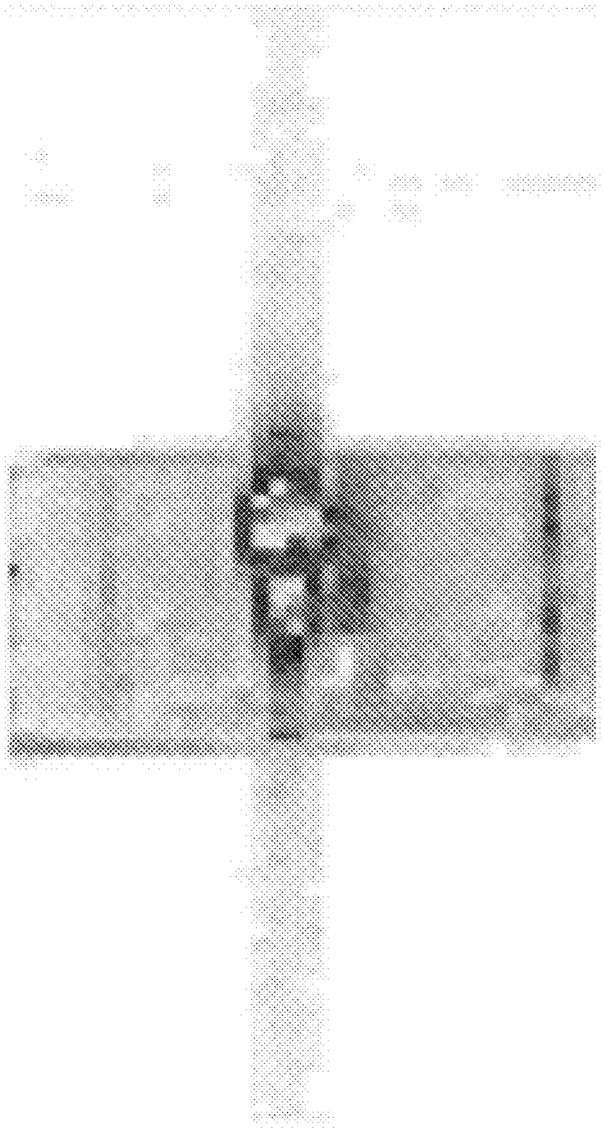

FIG. 14 provides an illustration for a two sided bloom scenario. If bloom is two sided, the analysis of each side can be performed separately or combined. In the first option where each side is analyzed separately, either the average of the two retroreflector intensity estimates or the lesser of the two retroreflector intensity estimates is selected. This selection may be based on certain factors such as which side is the shorter side and/or whether one or both sides contain point(s) which are only stray light. In the second options where the two sides are analyzed together, there is no need to select between the average of the two retroreflector intensity estimates or the lesser of the two retroreflector intensity estimates. This solution can be configured to protect against the case that one of the two sides does not contain stray light.

According to some aspects, methods of the present disclosure may be performed by computing systems and circuitry of the lidar system and/or an on board computing system of a vehicle (for example, an AV). An illustrative architecture for a vehicle is provided in FIG. 15. The vehicle performing the methods of the present solution may have the same or similar system architecture as that shown in FIG. 15. Thus, the following discussion of system architecture is sufficient for understanding one configuration of an AV. However, other types of vehicles are considered within the scope of the technology described in this document and may contain more or less elements as described in association with FIG. 15. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known. Upon detection of a bloom effect signal, on board computing device's enhanced ability to process the signal would enable the AV to more successfully navigate a route and perform autonomous transportation.

Figure 15:
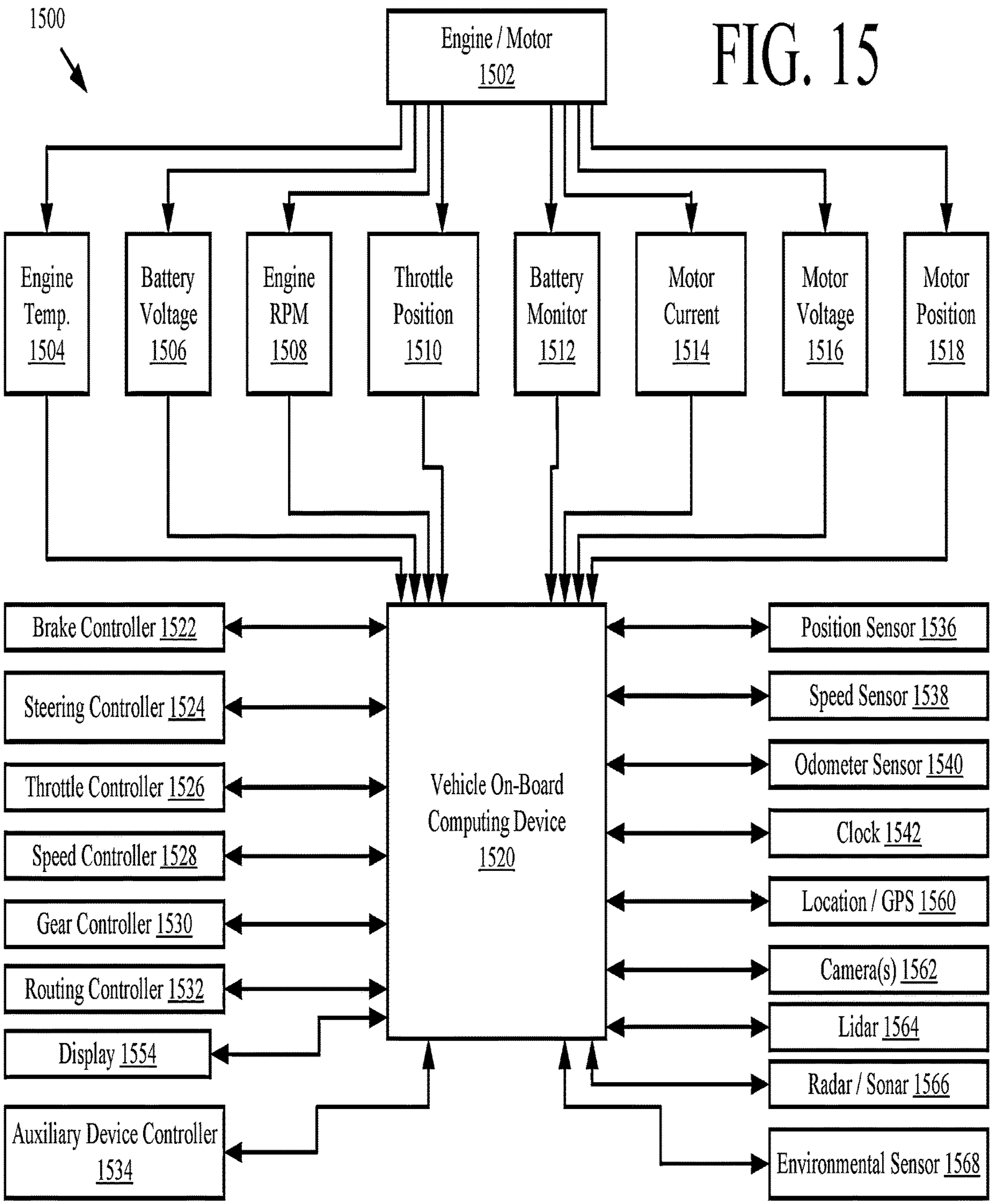
FIG. 15 provides an illustration of vehicle architecture.

For example, as shown in FIG. 15, system architecture for a vehicle includes an engine or motor 1502 and various sensors 1504-1518 for measuring various parameters of the vehicle. In gas-powered or hybrid vehicles having a fuel-powered engine, the sensors may include, for example, an engine temperature sensor 1504, a battery voltage sensor 1506, an engine revolutions per minute (RPM) sensor 1508, and a throttle position sensor 1510. If the vehicle is an electric or hybrid vehicle, then the vehicle may have an electric motor, and accordingly includes sensors such as a battery monitoring system 1512 (to measure current, voltage and/or temperature of the battery), motor current 1514 and voltage 1516 sensors, and motor position sensors 1518 such as resolvers and encoders.

Operational parameter sensors that are common to both types of vehicles include, for example: a position sensor 1536 such as an accelerometer, gyroscope and/or inertial measurement unit; a speed sensor 1538; and an odometer sensor 1540. The vehicle also may have a clock 1542 that the system uses to determine vehicle time during operation. The clock 1542 may be encoded into the vehicle on-board computing device, it may be a separate device, or multiple clocks may be available.

The vehicle also may include various sensors that operate to gather information about the environment in which the vehicle is traveling. These sensors may include, for example: a location sensor 1560 (such as a Global Positioning System (GPS) device); object detection sensors such as one or more cameras 1562; a lidar system 1564; and/or a radar and/or a sonar system 1566. The sensors also may include environmental sensors 1568 such as a precipitation sensor and/or ambient temperature sensor. The object detection sensors may enable the vehicle to detect objects that are within a given distance range of the vehicle in any direction, while the environmental sensors collect data about environmental conditions within the vehicle's area of travel.

During operations, information is communicated from the sensors to a vehicle on-board computing device 1520. The vehicle on-board computing device 1520 analyzes the data captured by the sensors and optionally controls operations of the vehicle based on results of the analysis. For example, the vehicle on-board computing device 1520 may control: braking via a brake controller 1522; direction via a steering controller 1524; speed and acceleration via a throttle controller 1526 (in a gas-powered vehicle) or a motor speed controller 1528 (such as a current level controller in an electric vehicle); a differential gear controller 1530 (in vehicles with transmissions); and/or other controllers. Auxiliary device controller 1554 may be configured to control one or more auxiliary devices, such as testing systems, auxiliary sensors, mobile devices transported by the vehicle, etc.

Geographic location information may be communicated from the location sensor 1560 to the on-board computing device 1520, which may then access a map of the environment that corresponds to the location information to determine known fixed features of the environment such as streets, buildings, stop signs and/or stop/go signals. Captured images from the cameras 1562 and/or object detection information captured from sensors such as lidar system 1564 is communicated from those sensors) to the on-board computing device 1520. The object detection information and/or captured images are processed by the on-board computing device 1520 to detect objects in proximity to the vehicle. Any known or to be known technique for making an object detection based on sensor data and/or captured images can be used in the present solution.

Lidar information is communicated from lidar system 1564 to the on-board computing device 1520. Additionally, captured images are communicated from the camera(s) 1562 to the vehicle on-board computing device 1520. The lidar information and/or captured images are processed by the vehicle on-board computing device 1520 to detect objects in proximity to the vehicle. The manner in which the object detections are made by the vehicle on-board computing device 1520 includes such capabilities detailed in this disclosure.

In addition, the system architecture 1500 may include an onboard display device 1514 that may generate and output an interface on which sensor data, vehicle status information, or outputs generated by the processes described in this document are displayed to an occupant of the vehicle. The display device may include, or a separate device may be, an audio speaker that presents such information in audio format.

The on-board computing device 1520 may include and/or may be in communication with a routing controller 1532 that generates a navigation route from a start position to a destination position for an autonomous vehicle. The routing controller 1532 may access a map data store to identify possible routes and road segments that a vehicle can travel on to get from the start position to the destination position. The routing controller 1532 may score the possible routes and identify a preferred route to reach the destination. For example, the routing controller 1532 may generate a navigation route that minimizes Euclidean distance traveled or other cost function during the route, and may further access the traffic information and/or estimates that can affect an amount of time it will take to travel on a particular route. Depending on implementation, the routing controller 1532 may generate one or more routes using various routing methods, such as Dijkstra's algorithm, Bellman-Ford algorithm, or other algorithms. The routing controller 1532 may also use the traffic information to generate a navigation route that reflects expected conditions of the route (for example, current day of the week or current time of day, etc.), such that a route generated for travel during rush-hour may differ from a route generated for travel late at night. The routing controller 1532 may also generate more than one navigation route to a destination and send more than one of these navigation routes to a user for selection by the user from among various possible routes.

The on-board computing device 1520 may determine perception information of the surrounding environment of the vehicle. Based on the sensor data provided by one or more sensors and location information that is obtained, the on-board computing device 1520 may determine perception information of the surrounding environment of the vehicle. The perception information may represent what an ordinary driver would perceive in the surrounding environment of a vehicle. The perception data may include information relating to one or more objects in the environment of the vehicle. For example, the on-board computing device 1520 may process sensor data (for example, lidar or radar data, camera images, etc.) in order to identify objects and/or features in the environment of vehicle. The objects may include traffic signals, roadway boundaries, other vehicles, pedestrians, and/or obstacles, etc. The on-board computing device 1520 may use any now or hereafter known object recognition algorithms, video tracking algorithms, and computer vision algorithms (for example, track objects frame-to-frame iteratively over a number of time periods) to determine the perception.

The on-board computing device 1520 may also determine, for one or more identified objects in the environment, the current state of the object. The state information may include, without limitation, for each object: current location; current speed and/or acceleration, current heading; current pose; current shape, size, or footprint; type (for example: vehicle, pedestrian, bicycle, static object or obstacle); and/or other state information.

The on-board computing device 1520 may perform one or more prediction and/or forecasting operations. For example, the on-board computing device 1520 may predict future locations, trajectories, and/or actions of one or more objects. For example, the on-board computing device 1520 may predict the future locations, trajectories, and/or actions of the objects based at least in part on perception information (for example, the state data for each object comprising an estimated shape and pose determined as discussed below), location information, sensor data, and/or any other data that describes the past and/or current state of the objects, the vehicle, the surrounding environment, and/or their relationship(s). For example, if an object is a vehicle and the current driving environment includes an intersection, the on-board computing device 1520 may predict whether the object will likely move straight forward or make a turn. If the perception data indicates that the intersection has no traffic light, the on-board computing device 1520 may also predict whether the vehicle may have to fully stop prior to entering the intersection.

The on-board computing device 1520 may determine a motion plan for the autonomous vehicle. For example, the on-board computing device 1520 may determine a motion plan for the autonomous vehicle based on the perception data and/or the prediction data. Specifically, given predictions about the future locations of proximate objects and other perception data, the on-board computing device 1520 can determine a motion plan for the vehicle that best navigates the autonomous vehicle relative to the objects at their future locations.

The on-board computing device 1520 may receive predictions and make a decision regarding how to handle objects and/or actors in the environment of the vehicle. For example, for a particular actor (for example, a vehicle with a given speed, direction, turning angle, etc.), the on-board computing device 1520 decides whether to overtake, yield, stop, and/or pass based on, for example, traffic conditions, map data, state of the autonomous vehicle, etc.

Furthermore, the on-board computing device 1520 also plans a path for the vehicle to travel on a given route, as well as driving parameters (for example, distance, speed, and/or turning angle). That is, for a given object, the on-board computing device 1520 decides what to do with the object and determines how to do it. For example, for a given object, the on-board computing device 1520 may decide to pass the object and may determine whether to pass on the left side or right side of the object (including motion parameters such as speed). The on-board computing device 1520 may also assess the risk of a collision between a detected object and the vehicle. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (for example, N milliseconds). If the collision can be avoided, then the on-board computing device 1520 may execute one or more control instructions to perform a cautious maneuver (for example, mildly slow down, accelerate, change lane, or swerve). In contrast, if the collision cannot be avoided, then the on-board computing device 1520 may execute one or more control instructions for execution of an emergency maneuver (for example, brake and/or change direction of travel).

As discussed above, planning and control data regarding the movement of the autonomous vehicle is generated for execution. The on-board computing device 1520 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Figure 16:
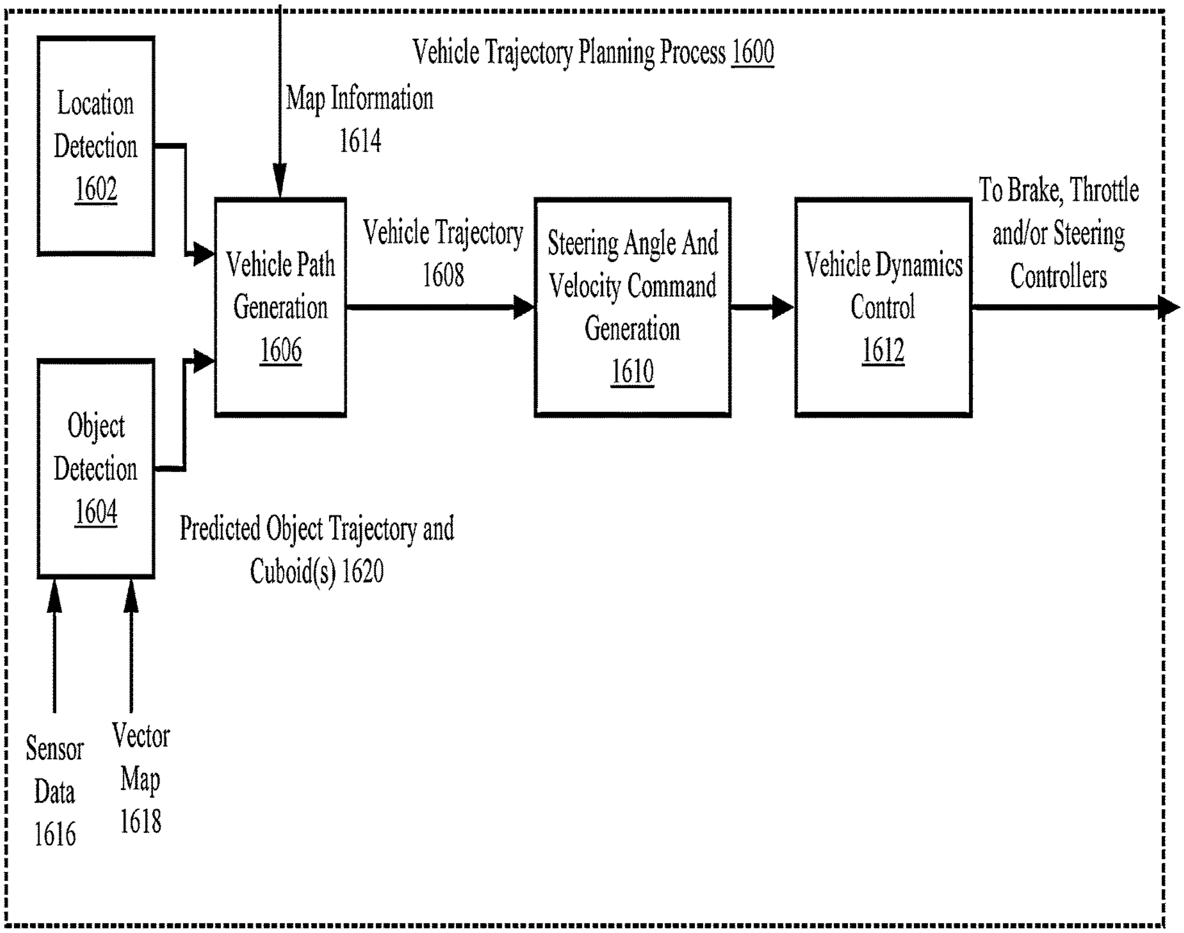
FIG. 16 provides a block diagram of an illustrative vehicle trajectory planning process.
Figure 17:
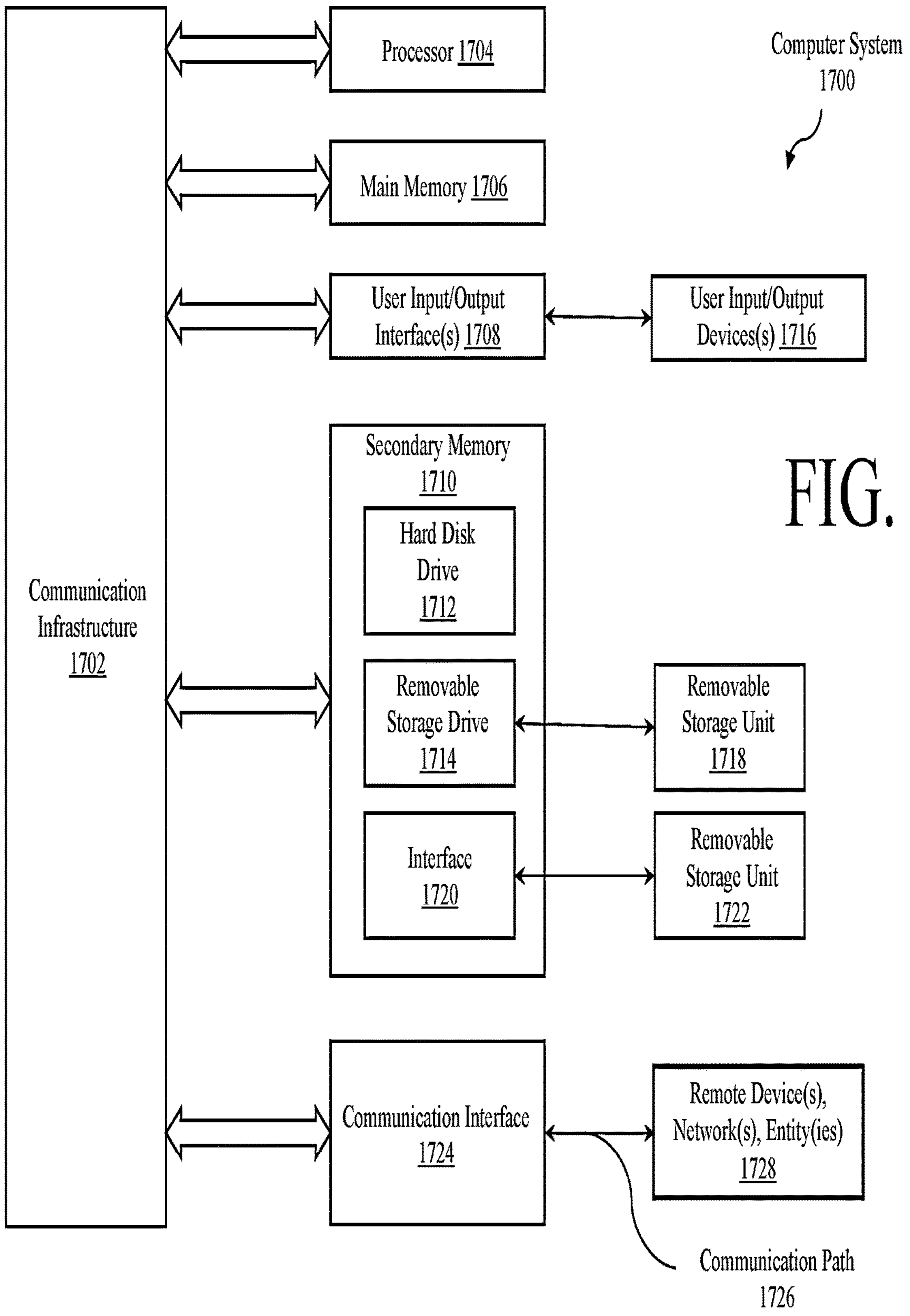
FIG. 17 provides an illustration of a computer system.

FIG. 16 provides a block diagram that is useful for understanding how motion or movement of an AV is achieved in accordance with the present solution. All of the operations performed in blocks 1602-1612 can be performed by the on-board computing device (for example, AV system 104 of FIG. 1, on-board computing device 1520 of FIG. 15) of a vehicle (for example, AV 102 of FIG. 1).

In block 1602, a location of the AV (for example, AV 102 of FIG. 1) is detected. This detection can be made based on sensor data output from a location sensor (for example, location sensor 1560 of FIG. 15) of the AV. This sensor data can include, but is not limited to, GPS data. The detected location of the AV is then passed to block 1606.

In block 1604, an object (for example, vehicle 122 of FIG. 1, pedestrian 124 of FIG. 1, or cyclist 126 of FIG. 1) is detected within proximity of the AV (for example, <100+ meters). This detection is made based on sensor data output from a camera (for example, camera 1562 of FIG. 15) of the AV and/or a lidar system (for example, lidar system 1564 of FIG. 15) of the AV. For example, image processing is performed to detect an instance of an object of a certain class (for example, a vehicle, cyclist or pedestrian) in an image. The image processing/object detection can be achieved in accordance with any known or to be known image processing/object detection algorithm.

Additionally, a predicted trajectory is determined in block 1604 for the object. The object's trajectory is predicted in block 1604 based on the object's class, cuboid geometry(ies), cuboid heading(s) and/or contents of a map 1618 (for example, sidewalk locations, lane locations, lane directions of travel, driving rules, etc.). The manner in which the cuboid geometry(ies) and heading(s) are determined will become evident as the discussion progresses. At this time, it should be noted that the cuboid geometry(ies) and/or heading(s) are determined using sensor data of various types (for example, 2D images, 3D lidar point clouds) and a map 1618 (for example, lane geometries). Techniques for predicting object trajectories based on cuboid geometries and headings may include, for example, predicting that the object is moving on a linear path in the same direction as the heading direction of a cuboid. The predicted object trajectories can include, but are not limited to, the following trajectories: a trajectory defined by the object's actual speed (for example, 1 mile per hour) and actual direction of travel (for example, west); a trajectory defined by the object's actual speed (for example, 1 mile per hour) and another possible direction of travel (for example, south, south-west, or X (for example, 40°) degrees from the object's actual direction of travel in a direction towards the AV) for the object; a trajectory defined by another possible speed for the object (for example, 2-10 miles per hour) and the object's actual direction of travel (for example, west); and/or a trajectory defined by another possible speed for the object (for example, 2-10 miles per hour) and another possible direction of travel (for example, south, south-west, or X (for example, 40°) degrees from the object's actual direction of travel in a direction towards the AV) for the object. The possible speed(s) and/or possible direction(s) of travel may be pre-defined for objects in the same class and/or sub-class as the object. It should be noted once again that the cuboid defines a full extent of the object and a heading of the object. The heading defines a direction in which the object's front is pointed, and therefore provides an indication as to the actual and/or possible direction of travel for the object.

Information 1620 specifying the object's predicted trajectory, the cuboid geometry(ies)/heading(s) is provided to block 1606. In some scenarios, a classification of the object is also passed to block 1606. In block 1606, a vehicle trajectory is generated using the information from blocks 1602 and 1604. Techniques for determining a vehicle trajectory using cuboids may include, for example, determining a trajectory for the AV that would pass the object when the object is in front of the AV, the cuboid has a heading direction that is aligned with the direction in which the AV is moving, and the cuboid has a length that is greater than a threshold value. The present solution is not limited to the particulars of this scenario. The vehicle trajectory 1608 can be determined based on the location information from block 1602, the object detection information from block 1604, and/or map information 1614 (which is pre-stored in a data store of the vehicle). The map information 1614 may include, but is not limited to, all or a portion of road map(s). The vehicle trajectory 1608 may represent a smooth path that does not have abrupt changes that would otherwise provide passenger discomfort. For example, the vehicle trajectory is defined by a path of travel along a given lane of a road in which the object is not predicted to travel within a given amount of time. The vehicle trajectory 1608 is then provided to block 1610.

In block 1610, a steering angle and velocity command is generated based on the vehicle trajectory 1608. The steering angle and velocity command are provided to block 1610 for vehicle dynamics control, i.e., the steering angle and velocity command causes the AV to follow the vehicle trajectory 1608.

The onboard computing device and/or offboard (remote) computing devices, or lidar computing devices may be using one or more computer systems. Computer system 1700 can be any computer capable of performing the functions described in this document.

Computer system 1700 includes one or more processors (also called central processing units, or CPUs), such as a processor 1704. Processor 1704 is connected to a communication infrastructure or bus 1702. Optionally, one or more of the processors 1704 may each be a graphics processing unit (GPU). The GPU may comprise a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1700 also includes user input/output device(s) 1716, such as monitors, keyboards, pointing devices, etc., that communicate with communication infrastructure 1702 through user input/output interface(s) 1708.

Computer system 1700 also includes a main or primary memory 1706, such as random access memory (RAM). Main memory 1706 may include one or more levels of cache. Main memory 1706 has stored therein control logic (i.e., computer software) and/or data.

Computer system 1700 may also include one or more secondary storage devices or memory 1710. Main memory 1706 may be considered the first memory and secondary memory 1710 may be considered the second memory, or vice versa. Alternatively, secondary memory 1706 may include multiple subcomponents that together serve as the first memory and the second memory. Secondary memory 1710 may include, for example, a hard disk drive 1712 and/or a removable storage device or drive 1714. Removable storage drive 1714 may be an external hard drive, a universal serial bus (USB) drive, a memory card such as a compact flash card or secure digital memory, a floppy disk drive, a magnetic tape drive, a compact disc drive, an optical storage device, a tape backup device, and/or any other storage device and/or drive.

Removable storage drive 1714 may interact with a removable storage unit 1718. Removable storage unit 1718 includes a computer usable or readable storage device having stored thereon computer software (control logic) and/or data. Removable storage unit 1718 may be an external hard drive, a universal serial bus (USB) drive, a memory card such as a compact flash card or secure digital memory, a floppy disk, a magnetic tape, a compact disc, a DVD, an optical storage disk, and/any other computer data storage device. Removable storage drive 1714 reads from and/or writes to removable storage unit 1718 in any suitable known manner.

Secondary memory 1710 may include other means, instrumentalities or other approaches for allowing computer programs and/or other instructions and/or data to be accessed by computer system 1700. Such means, instrumentalities or other approaches may include, for example, a removable storage unit 1722 and an interface 1720. Examples of the removable storage unit 1722 and the interface 1720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1700 may further include a communication or network interface 1724. Communication interface 1724 enables computer system 1700 to communicate and interact with any combination of remote devices, remote networks, remote entities, etc. (individually and collectively referenced by reference number 1728). For example, communication interface 1724 may allow computer system 1700 to communicate with remote devices 1728 over communications path 1726, which may be wired and/or wireless, and which may include any combination of LANs, WANs, the Internet, etc. Control logic and/or data may be transmitted to and from computer system 1700 via communication path 1726.

A tangible, non-transitory apparatus or article of manufacture comprising a tangible, non-transitory computer useable or readable medium having control logic (software) stored thereon is also referred to in this document as a computer program product or program storage device. This includes, but is not limited to, computer system 1700, main memory 1706, secondary memory 1710, and removable storage units 1718 and 1722, as well as tangible articles of manufacture embodying any combination of the foregoing. Such control logic, when executed by one or more data processing devices (such as computer system 1700), causes such data processing devices to operate as described in this document.

Terms that are relevant to this disclosure include the following.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices, which may be components of a single device or components of separate devices, together or collectively perform a process.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes example embodiments for example fields and applications, it should be understood that the disclosure is not limited to the disclosed examples. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described in this document. Further, embodiments (whether or not explicitly described) have significant utility to fields and applications beyond the examples described in this document.

Embodiments have been described in this document with the aid of functional building blocks illustrating the implementation of specified functions and relationships. The boundaries of these functional building blocks have been arbitrarily defined in this document for the convenience of the description. Alternate boundaries can be defined as long as the specified functions and relationships (or their equivalents) are appropriately performed. Also, alternative embodiments can perform functional blocks, steps, operations, methods, etc. using orderings different than those described in in this document.

The features from different embodiments disclosed herein may be freely combined. For example, one or more features from a method embodiment may be combined with any of the system or product embodiments. Similarly, features from a system or product embodiment may be combined with any of the method embodiments herein disclosed.

References in this document to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described in this document. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments, but should be defined only in accordance with the following claims and their equivalents.

The invention claimed is:

1. A method for reducing optical interference in an optical sensor comprising:

detecting, by an optical sensor device comprising a plurality of pixel sensors, a signal with a reflected light component and a stray light component;

estimating, by a processor, a stray light intensity in each pixel of the plurality of pixel sensors using a point spread function obtained by emitting a reference light signal and measuring intensities detected by the plurality of pixel sensors;

identifying, by the processor, at least one pixel associated with a relatively high intensity from the plurality of pixel sensors of the optical sensor device, wherein the identified pixel is considered to be associated with a retroreflector or a bloom causing object;

adjusting, by the processor, a noise probability for the signal using the estimated stray light intensity and an unbiased noise intensity; and adjusting, by the processor, a signal confidence score using the adjusted noise probability.

2. The method according to claim 1, further comprising using the adjusted signal confidence score to control autonomous operations of a robot.

3. The method according to claim 1, wherein identifying further comprises classifying points in a point cloud as bloom points, the point cloud being generated based on outputs from the optical sensor device.

4. The method according to claim 3, wherein the classifying comprises identifying points of the point cloud that have range values within a given range tolerance defined by the minimum range and maximum range associated with a pixel considered to possibly be associated with an object causing bloom.

5. The method according to claim 4, wherein the classifying further comprises filtering the point using heuristics or confidence thresholding.

6. The method according to claim 1, wherein the noise probability is adjusted by adding the estimated stray light intensity to the unbiased noise intensity or by multiplying a first number derived using the unbiased noise intensity and a second number derived using the estimated stray light intensity.

7. The method according to claim 1, wherein the adjusted signal confidence score is a function of a span count and a trial count in addition to the adjusted noise probability.

8. The method according to claim 1, further comprising adjusting an intensity of the reflected light using the adjusted noise probability and a photon detection efficiency.

9. The method according to claim 1, further comprising filtering points from a point cloud based on a comparison of the adjusted signal confidence score to a threshold value.

10. The method according to claim 1, wherein the estimating further comprises estimating a relationship between stray light distribution and pixel indices of the optical sensor device, and wherein a normalized stray light intensity distribution is compared to a pixel index in the point spread function.

11. A system, comprising:

an optical sensor device comprising a plurality of pixel sensors and configured to detect a signal with a reflected light component and a stray light component;

a processor; and a non-transitory computer-readable storage medium comprising programming instructions that are configured to cause the processor to implement a method for operating a system, wherein the programming instructions comprise instructions to:

estimate a stray light intensity in each pixel of the plurality of pixel sensors using a point spread function obtained by emitting a reference light signal and measuring intensities detected by the plurality of pixel sensors;

identify at least one pixel associated with a relatively high intensity from the plurality of pixel sensors of the optical sensor device, wherein the identified pixel is considered to be associated with a retroreflector or a bloom causing object;

adjust a noise probability for the signal using the estimated stray light intensity and an unbiased noise intensity; and adjust a signal confidence score using the adjusted noise probability.

12. The system according to claim 11, wherein the programming instructions further comprise instructions to classify points in a point cloud as bloom points, the point cloud being generated based on outputs from the optical sensor device.

13. The system according to claim 12, wherein identified points have range values within a given range tolerance defined by the minimum range and maximum range associated with a pixel considered to possibly be associated with an object causing bloom.

14. The system according to claim 13, wherein the identified point are filtered using heuristics or confidence thresholding.

15. The system according to claim 11, wherein the noise probability is adjusted by adding the estimated stray light intensity to the unbiased noise intensity or by multiplying a first number derived using the unbiased noise intensity and a second number derived using the estimated stray light intensity.

16. The system according to claim 11, wherein the adjusted signal confidence score is a function of a span count and a trial count in addition to the adjusted noise probability.

17. The system according to claim 11, wherein the programming instructions further comprise instructions to adjust an intensity of the reflected light using the adjusted noise probability and a photon detection efficiency.

18. The system according to claim 11, wherein the programming instructions further comprise instructions to filter points from a point cloud based on a comparison of the adjusted signal confidence score to a threshold value.

19. The system according to claim 11, wherein the programming instructions further comprise instructions to estimate a relationship between stray light distribution and pixel indices of the optical sensor device, and wherein a normalized stray light intensity distribution is compared to a pixel index in the point spread function.

20. A non-transitory computer-readable medium that stores instructions that, when executed by at least one computing device, will cause the at least one computing device to perform operations comprising:

estimating, by a processor, a stray light intensity in each pixel of the plurality of pixel sensors using a point spread function obtained by emitting a reference light signal and measuring intensities detected by the plurality of pixel sensors;

identifying, by the processor, at least one pixel associated with a relatively high intensity from the plurality of pixel sensors of the optical sensor device, wherein the identified pixel is considered to be associated with a retroreflector or a bloom causing object;

adjusting, by the processor, a noise probability for the signal using the estimated stray light intensity and an unbiased noise intensity; and adjusting, by the processor, a signal confidence score using the adjusted noise probability.

* * * * *